(12) United States Patent
Ogura

(10) Patent No.: US 12,444,799 B2
(45) Date of Patent: Oct. 14, 2025

(54) BATTERY APPARATUS

(71) Applicant: MAKITA CORPORATION, Anjo (JP)

(72) Inventor: Hironori Ogura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 756 days.

(21) Appl. No.: 17/659,060

(22) Filed: Apr. 13, 2022

(65) Prior Publication Data

US 2022/0336895 A1  Oct. 20, 2022

(30) Foreign Application Priority Data

Apr. 19, 2021 (JP) ................................ 2021-070236

(51) Int. Cl.

| | |
|---|---|
| *H01M 50/213* | (2021.01) |
| *A62C 3/16* | (2006.01) |
| *H01M 10/0525* | (2010.01) |
| *H01M 50/227* | (2021.01) |
| *H01M 50/231* | (2021.01) |

(Continued)

(52) U.S. Cl.
CPC ............. *H01M 50/213* (2021.01); *A62C 3/16* (2013.01); *H01M 50/227* (2021.01); *H01M 50/231* (2021.01); *H01M 50/233* (2021.01); *H01M 50/247* (2021.01); *H01M 50/256* (2021.01); *H01M 50/264* (2021.01); *H01M 10/0525* (2013.01); *H01M 2200/00* (2013.01); *H01M 2220/30* (2013.01)

(58) Field of Classification Search
CPC . H01M 50/227; H01M 50/213; H01M 50/256
See application file for complete search history.

(56) References Cited

U.S. PATENT DOCUMENTS

2012/0282503 A1  11/2012  Fujikawa et al.
2014/0170447 A1  6/2014  Woehrle et al.
(Continued)

FOREIGN PATENT DOCUMENTS

| CN | 103561822 A | 2/2014 | |
|---|---|---|---|
| CN | 203800094 U | * 8/2014 | ............ H01M 2/024 |

(Continued)

OTHER PUBLICATIONS

English translation of the International Search Report dated Oct. 20, 2020 for related PCT application No. PCT/JP2020/033298.
(Continued)

*Primary Examiner* — Robert S Carrico
(74) *Attorney, Agent, or Firm* — J-TEK LAW PLLC; Jeffrey D. Tekanic; Scott T. Wakeman

(57) ABSTRACT

A battery apparatus may include: one or more battery cells; a fire-extinguishing agent, which includes a component, chemical or composition that has a combustion inhibiting or suppressing effect; a flame-resistant member having a limiting oxygen index that is higher than the oxygen concentration in the atmosphere; and a casing, which is made of a polymer and houses the battery cell(s), the fire-extinguishing agent, and the flame-resistant member. The fire-extinguishing agent may be interposed between the battery cell(s) and the casing. The flame-resistant member may be interposed between the fire-extinguishing agent and the casing.

20 Claims, 14 Drawing Sheets

(51) Int. Cl.
H01M 50/233 (2021.01)
H01M 50/247 (2021.01)
H01M 50/256 (2021.01)
H01M 50/264 (2021.01)

(56) References Cited

U.S. PATENT DOCUMENTS

| | | | | |
|---|---|---|---|---|
| 2015/0155535 | A1* | 6/2015 | Fujikawa | H01M 50/107 |
| | | | | 429/54 |
| 2015/0325826 | A1 | 11/2015 | Verhaag et al. | |
| 2018/0205048 | A1 | 7/2018 | Enomoto et al. | |
| 2018/0248157 | A1* | 8/2018 | Suzuki | H01M 50/24 |
| 2020/0044478 | A1* | 2/2020 | Tally | H01M 10/465 |
| 2021/0359372 | A1* | 11/2021 | Wu | H01M 50/148 |
| 2022/0115737 | A1 | 4/2022 | Shin et al. | |
| 2023/0062907 | A1 | 3/2023 | Ogura | |

FOREIGN PATENT DOCUMENTS

| | | | | |
|---|---|---|---|---|
| CN | 104091904 | A | | 10/2014 |
| CN | 206098596 | U | | 4/2017 |
| CN | 206250352 | U | | 6/2017 |
| DE | 102014211032 | A1 * | 12/2015 | ......... H01M 2/1077 |
| JP | 2009099322 | A | | 5/2009 |
| JP | 2009131089 | A * | 6/2009 | |
| JP | 2010097836 | A | | 4/2010 |
| JP | 2014049226 | A | | 3/2014 |
| JP | 2014517986 | A | | 7/2014 |
| JP | 2016018605 | A | | 2/2016 |
| JP | 2018133292 | A | | 8/2018 |
| JP | 2018206656 | A | | 12/2018 |
| JP | 2019067583 | A | | 4/2019 |
| JP | 2020507903 | A | | 3/2020 |
| WO | 2012032695 | A1 | | 3/2012 |
| WO | 2017125985 | A1 | | 7/2017 |
| WO | 2018159000 | A1 | | 9/2018 |
| WO | 2021002626 | A1 | | 1/2021 |

OTHER PUBLICATIONS

English translation of the Written Opinion of the International Searching Authority dated Oct. 20, 2020 for related PCT application No. PCT/JP2020/033298.
Office Action from the Chinese Patent Office dispatched Nov. 15, 2023, in related Chinese application No. 202080093084.1, and translation thereof.
Office Action from the Japanese Patent Office dispatched Nov. 21, 2023, in related Japanese application No. 2020-013201, and machine translation thereof.
Office Action from the Chinese Patent Office dispatched Aug. 16, 2024, in related Chinese application No. 202080093084.1, and translation thereof.
Office Action from the Chinese Patent Office dispatched May 10, 2024, in related Chinese application No. 202080093084.1, and translation thereof.
Office Action from the Japanese Patent Office dispatched May 7, 2024, in related Japanese application No. 2020-013201, and machine translation thereof.
Office Action from the Japanese Patent Office dispatched Mar. 4, 2025, in counterpart JP application No. 2021-070236, and machine translation thereof.
Communication dispatched Jul. 28, 2025, from the Japanese Patent Office, providing Notice of Reasons for Revocation of related Japanese Patent No. 7572782, and English translation thereof.
Communication received May 26, 2025, from the Japanese Patent Office conveying a Notice of Opposition filed by a third party against related Japanese Patent No. 7572782, and English translation thereof.

* cited by examiner

BATTERY APPARATUS

CROSS-REFERENCE TO RELATED APPLICATION

This application claims priority to Japanese patent application no. 2021-070236 filed on Apr. 19, 2021, the contents of which are fully incorporated herein by reference.

TECHNICAL FIELD

Techniques disclosed in the present specification relate to a battery apparatus, such as a battery pack that includes structures and/or materials for suppressing and/or resisting the spread of a fire within the battery pack.

BACKGROUND ART

U.S. Patent Application Publication No. 2015/0325826 discloses a battery apparatus that comprises: battery cells; fireproofing (intumescent) members, the volume of which swells in the event of burning of the battery cells; and a casing (housing), which houses the battery cells and the fireproofing members.

SUMMARY

With regard to the technique disclosed in US 2015/0325826, if any of the battery cells has been subjected to inappropriate handling and consequently has ignited, a certain amount of time is needed until the fire is extinguished by the fireproofing member(s). In the present specification, techniques are provided (described) wherein, in the event that one or more of the battery cells in the battery apparatus has (have) ignited, the fire can be extinguished more rapidly.

In one aspect of the present teachings, a battery apparatus may comprise: one or more battery cells; a fire-extinguishing agent, which includes a component (e.g., a chemical and/or a chemical composition) that provides (has) a fire-suppressing effect (e.g., a combustion inhibiting effect); a flame-resistant member, whose limiting oxygen index is higher than the oxygen concentration in the atmosphere; and a casing (housing), which is made of a resin (polymer) and houses the battery cell(s), the fire-extinguishing agent, and the flame-resistant member. The fire-extinguishing agent may be interposed between the battery cell(s) and the casing. The flame-resistant member may be interposed between the fire-extinguishing agent and the casing.

According to the above-mentioned configuration, if one or more of the battery cells has (have) been subjected to inappropriate handling or usage and consequently has (have) ignited, the fire can be extinguished more rapidly by the fire-suppressing effect of the fire-extinguishing agent. In addition, according to the above-mentioned configuration, even if flames emitted from the battery cell of the battery apparatus have broken through the fire-extinguishing agent, the flames are blocked by the flame-resistant member, and therefore it is possible to inhibit (suppress) the flames from reaching the casing.

DETAILED DESCRIPTION

Figure 1:
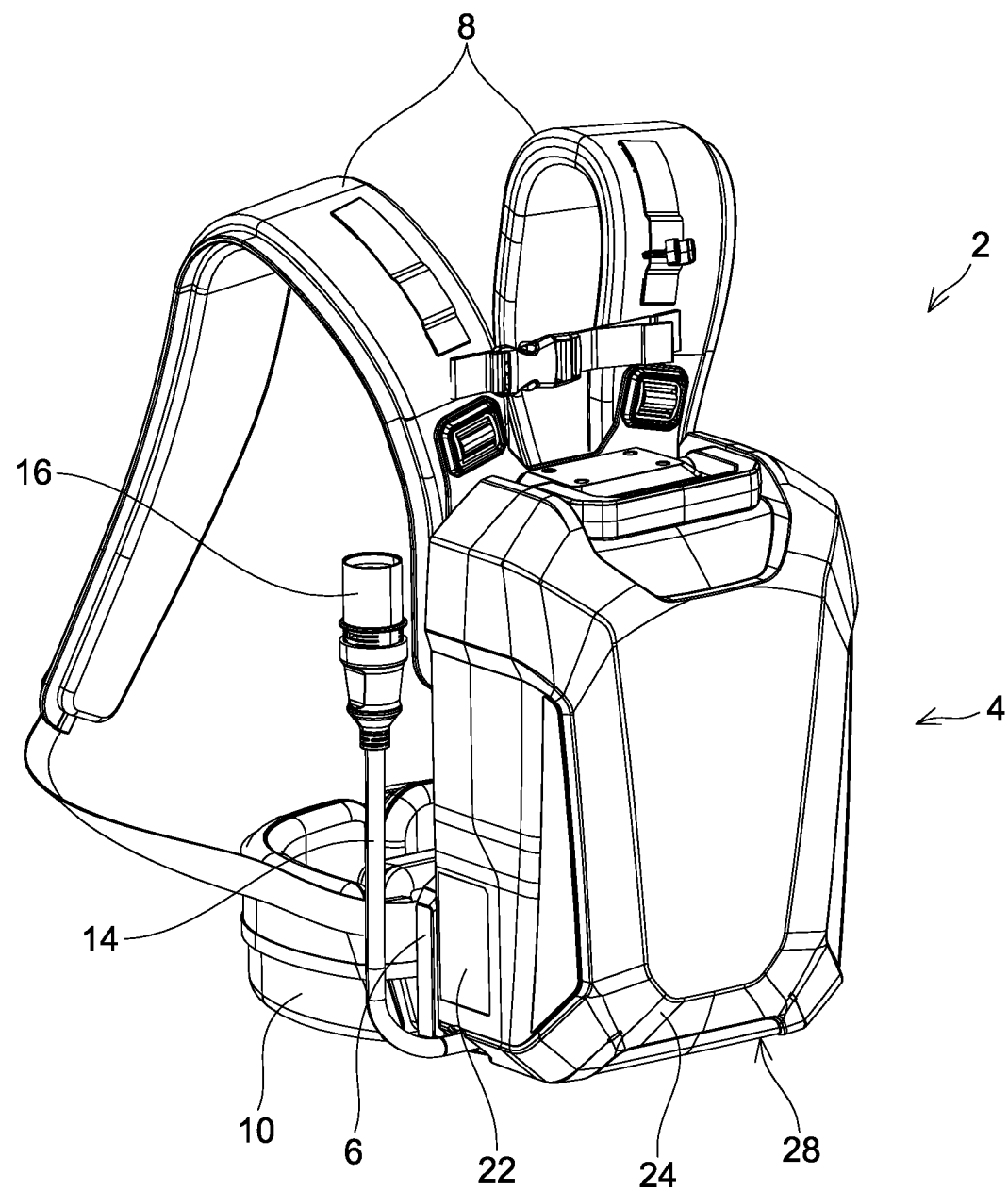
FIG. 1 is an oblique view of a backpack-type power supply 2, which comprises a battery apparatus 4, according to Working Example 1.
Figure 1:
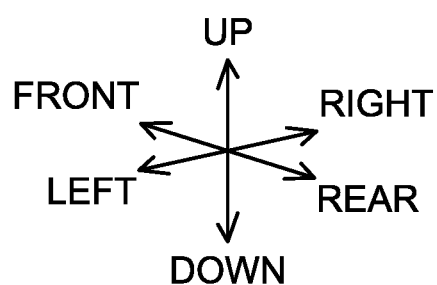

Representative and nonlimiting concrete (specific) examples of the present teachings are explained in detail below, with reference to the drawings. This detailed description is merely intended to describe to a person skilled in the art details for implementing preferred embodiments of the present teachings and is not intended to limit the scope of the present invention. In addition, the additional features and embodiments disclosed herein can be used separately and/or together with other features and embodiment in order to provide additional embodiments of an improved battery apparatus.

In addition, combinations of the features and processes disclosed in the detailed description below are, in the broadest meaning, not essential for implementing the present invention and are described merely to particularly explain representative concrete examples of the present teachings. Furthermore, in the provision of additional and useful embodiments of the present teachings, the various features of the representative concrete examples below and the various features recited in the claims do not have to be combined as in the concrete examples disclosed herein or in the order enumerated herein.

All features recited in the present specification and/or the claims are intended, separately from the configuration of features recited in the working examples and/or the claims, to be disclosed individually and mutually independently as limitations relative to specific matters disclosed in the disclosure and claims of the original patent application. Furthermore, description related to numerical ranges, groups, and collections are intended to disclose intermediate configurations or ranges thereof as limitations relative to specific matters recited in the disclosure and the original claims of the patent application.

In one or more embodiments, a battery apparatus may comprise: one or more battery cells; a fire-extinguishing agent, which includes a component (e.g., a chemical or a chemical composition) that provides (has) a fire-suppressing effect and/or a negative-catalyst effect with respect to (on) combustion (e.g., a combustion inhibiting effect or combustion suppressing effect); a flame-resistant member, whose limiting oxygen index is higher than the oxygen concentration in the atmosphere; and a casing (housing), which is made of a resin (polymer) and houses the battery cell(s), the fire-extinguishing agent, and the flame-resistant member. The fire-extinguishing agent may be interposed between the battery cell(s) and the casing. The flame-resistant member may be interposed between the fire-extinguishing agent and the casing. It is noted that the fire-suppressing effect (e.g., the combustion inhibiting effect or combustion suppressing effect) referred to in the present specification refers to the effect of inhibiting or even suppressing a combustion chain reaction (flames). In some embodiments of the present disclosure, the fire-extinguishing agent may have a negative-catalyst effect with respect to combustion. As the component, chemical or chemical composition that provides such a fire-suppressing effect and/or such a negative-catalyst effect with respect to combustion, the fire-extinguishing agent may be a component, chemical or chemical composition that absorbs and/or binds to combustion gases such as, for example, hydrogen, hydrogen sulfide, carbon monoxide, methane, ethane, propane, and/or ethylene. Alternatively, as the component, chemical or chemical composition that provides such a fire-suppressing effect and/or such a negative-catalyst effect with respect to combustion, the fire-extinguishing agent may be a component, chemical or chemical composition that inhibits or even suppresses the oxidation of flammable substances by generating sodium chloride, sodium carbonate, sodium sulfate, or the like during (in response to) combustion or heating of the fire-extinguishing agent.

According to the above-mentioned configuration, in the event that the battery cell(s) has (have) been subject to inappropriate handling and consequently has (have) ignited, the fire can be rapidly extinguished by the fire-suppressing effect (combustion inhibiting or suppressing effect) of the fire-extinguishing agent. In addition, according to the above-mentioned configuration, even if flames emitted from the battery cell(s) of the battery apparatus have broken through the fire-extinguishing agent, the flames are blocked by the flame-resistant member, and therefore it is possible to inhibit, block or suppress the flames from reaching the casing (housing).

In one or more embodiments, the battery cell(s) may have a substantially circular-column shape. The fire-extinguishing agent and the flame-resistant member may be interposed between an end surface of the battery cell(s) in the longitudinal direction and the casing.

If one or more of the battery cells having a substantially circular-column shape has (have) ignited, it is likely that flames will extend (spread, grow) from the end surfaces of the battery cell(s). According to the above-mentioned configuration, in the event that one or more of the battery cells has (have) ignited, the fire-extinguishing agent is directly exposed to the flames, and thereby the fire-suppressing effect and/or the negative-catalyst effect can be rapidly exhibited. If one or more of the battery cells has (have) been subjected to inappropriate handling and consequently has (have) ignited, the fire can be rapidly extinguished. In addition, according to the above-mentioned configuration, even if flames extending from the end surface(s) of the battery cell(s) break through the fire-extinguishing agent, the flames are blocked by the flame-resistant member, and therefore it is possible to inhibit, suppress or block the flames from reaching the casing.

In one or more embodiments, the battery apparatus may further comprise one or more cell holders, which hold(s) the battery cell(s). The battery cell(s) may be held by the cell holder(s) such that end surface(s) (positive or negative electrode(s)) of the battery cell(s) in the longitudinal direction is (are) exposed at a side surface of the cell holder(s). One or more of the flame-resistant members may cover the entirety of the side surface(s) of the cell holder(s).

According to the above-mentioned configuration, because the entirety of the side surface(s) of the cell holder(s), to which the end surface(s) of the battery cell(s) is (are) exposed, is covered by the flame-resistant member(s), it is possible to inhibit, block or suppress flames extending from the end surface(s) of the battery cell(s) from reaching the casing.

In one or more embodiments, the flame-resistant member may be interposed between and held by the cell holder(s) and the casing.

According to the above-mentioned configuration, when the battery apparatus is used by being carried around, the possibility of adverse mispositioning of the flame-resistant member can be reduced.

In one or more embodiments, the casing may be mountable on and demountable from a backpack frame, to which a shoulder belt is attached. The flame-resistant member may be interposed between a portion of the battery apparatus that opposes the backpack frame of the casing and the battery cell(s).

According to the above-mentioned configuration, if the battery cell(s) has (have) been subjected to inappropriate handling and consequently has (have) ignited, it is possible to inhibit, suppress or block the flames from reaching the portion of the battery apparatus that opposes the backpack frame of the casing.

In one or more embodiments, the flame-resistant member may be engaged with the casing.

According to the above-mentioned configuration, when the battery apparatus is used by being carried around, the possibility of adverse mispositioning of the flame-resistant member can be reduced.

In one or more embodiments, the casing may comprise a boss that protrudes inward from an inner surface of the casing. The flame-resistant member may have a through hole corresponding to the boss. By inserting the boss into the through hole, the flame-resistant member may become engaged with the casing.

There are situations in which a boss for positioning or screw-fastening the cell holder(s) is provided on the inner surface of the casing. According to the above-mentioned configuration, a boss, which is provided on the casing, is used, and therefore the flame-resistant member can be caused to engage with the casing.

In one or more embodiments, the flame-resistant member may be adhered to the casing.

According to the above-mentioned configuration, when the battery apparatus is used by being carried around, the possibility of adverse mispositioning relative to the casing of the flame-resistant member can be reduced.

In one or more embodiments, the flame-resistant member may be adhered to the fire-extinguishing agent.

According to the above-mentioned configuration, when the battery apparatus is used by being carried around, the possibility of adverse mispositioning relative to the fire-extinguishing agent of the flame-resistant member can be reduced.

In one or more embodiments, the battery apparatus may further comprise a protective member, which covers the flame-resistant member.

According to the above-mentioned configuration, even in situations such as in the event that the battery apparatus has been subjected to an impact or water has penetrated into the interior of the battery apparatus, the flame-resistant member can be protected.

In one or more embodiments, the protective member may cover both the flame-resistant member and the fire-extinguishing agent.

According to the above-mentioned configuration, even in situations such as in the event that the battery apparatus has been subjected to an impact or water has penetrated into the interior of the battery apparatus, the flame-resistant member and the fire-extinguishing agent can be protected.

In one or more embodiments, the battery cell may be charged to an SOC (state of charge) of 90% or more.

In the state in which the SOC of the battery cell is high, there is a risk that the battery cell(s) will burn aggressively in the event that one or more of the battery cell(s) ignite(s). According to the above-mentioned configuration, if the battery cell(s) has (have) been subjected to inappropriate handling and consequently has (have) ignited, adverse aggressive burning can be inhibited or suppressed. In addition, even if one or more of the battery cell(s) has (have) ignited, it is possible to inhibit, suppress or block the flames from adversely reaching the casing.

In one or more embodiments, the energy density of the battery cell(s) may be 300 Wh/liter or more. For example, the energy density of the battery cell(s) may be 400 Wh/liter or more, may be 500 Wh/liter or more, may be 600 Wh/liter or more, or may be 700 Wh/liter or more.

If the energy density of the battery cell(s) is high, then there is a risk that, in the event that the battery cell(s) has (have) ignited, the battery cell(s) will burn aggressively. According to the above-mentioned configuration, if the battery cell(s) has (have) been subjected to inappropriate handling and consequently has (have) ignited, adverse aggressive burning can be inhibited or suppressed. In addition, even if one or more of the battery cell(s) has (have) ignited, it is possible to inhibit, suppress or block the flames from adversely reaching the casing.

In one or more embodiments, the battery cell(s) may be one or more lithium-ion battery cells.

The risk that a lithium-ion battery cell will ignite, owing to a variety of causes, is higher than in other types (chemistries) of battery cells. According to the above-mentioned configuration, even if one or more of the lithium-ion battery cell(s) has (have) been subjected to inappropriate handling and consequently has (have) ignited, the fire can be rapidly extinguished. In addition, even if one or more of the lithium-ion battery cell(s) has (have) ignited, it is possible to inhibit, suppress or block the flames from adversely reaching the casing.

Working Example 1

As shown in FIG. 1, a backpack-type power supply 2 of the present Working Example 1 comprises: a battery apparatus 4; a backpack frame 6, on which the battery apparatus 4 is mountable and demountable; shoulder belts 8, which are attached to the backpack frame 6; and a hip belt 10, which is attached to the backpack frame 6. A user slings the shoulder belts 8 over the shoulders and straps the hip belt 10 around the hip, and thereby can hold the backpack-type power supply 2 with the backpack-type power supply 2 carried on the back, like a backpack. It is noted that, in the explanation below, in the state in which the user carries the backpack-type power supply 2 on the back, an up-down direction, a left-right direction, and a front-rear direction, when viewed from the user, refer to the up-down direction, the left-right direction, and the front-rear direction, respectively, of the backpack-type power supply 2.

Figure 2:
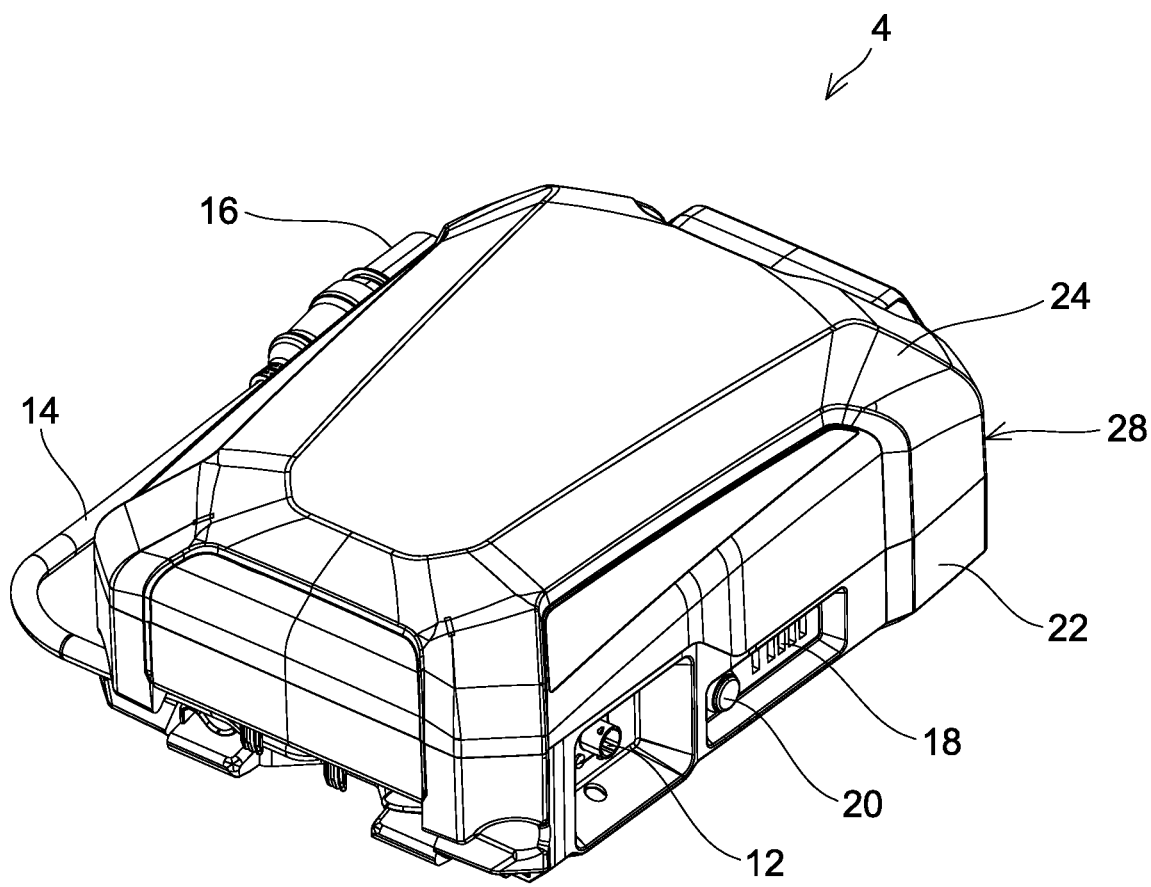
FIG. 2 is an oblique view of the battery apparatus 4 according to Working Example 1.
Figure 2:
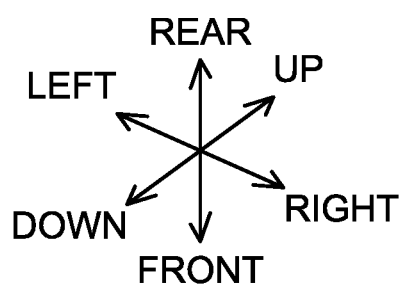
Figure 3:
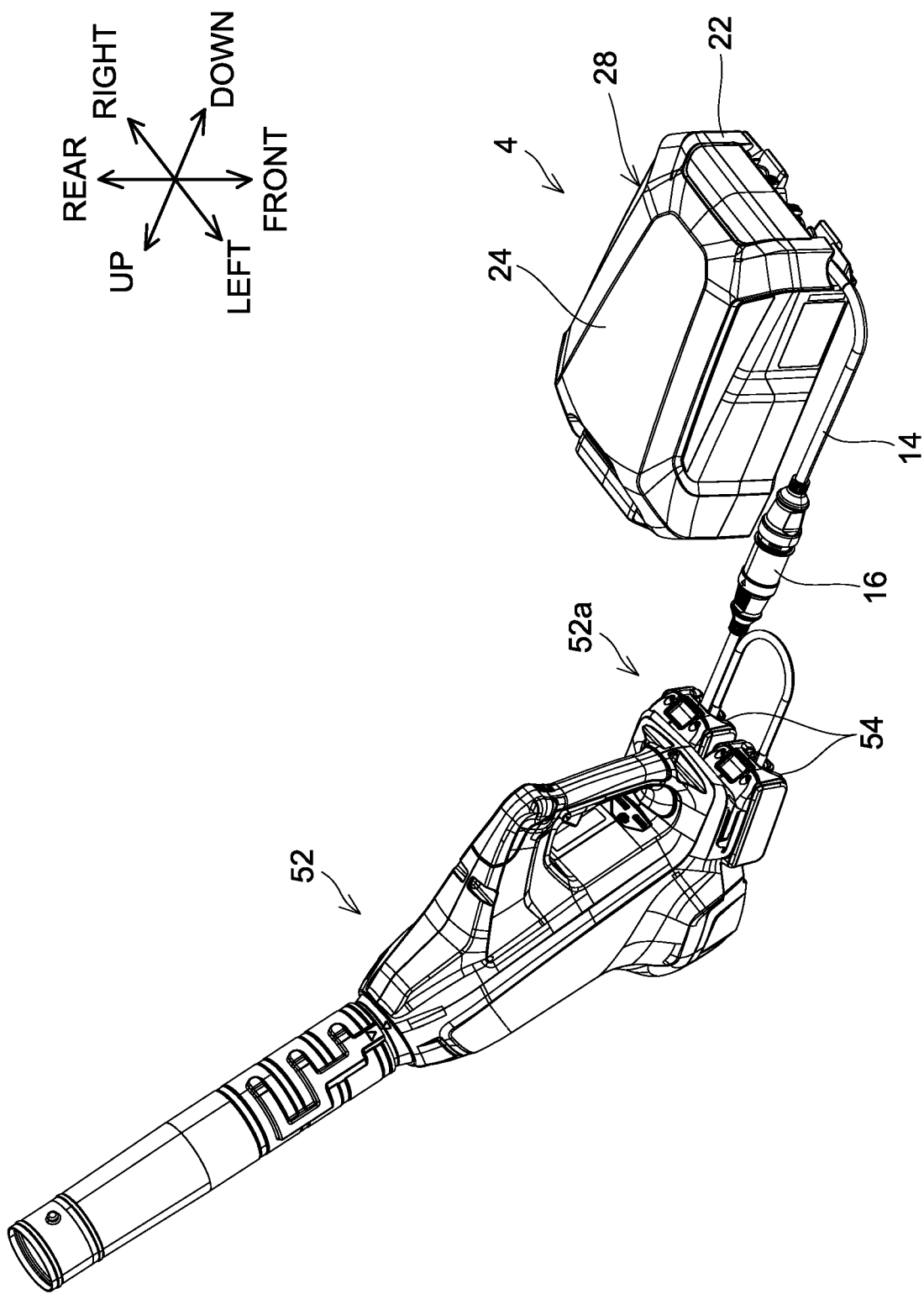
FIG. 3 is an oblique view that shows the state in which the battery apparatus 4 is connected to an electric work machine 52, according to Working Example 1.

As shown in FIG. 2, the battery apparatus 4 comprises a charging plug 12, a discharging cable 14, a discharging plug 16, a remaining-charge indication lamp 18, and a remaining-charge indication button 20. The discharging plug 16 is provided on (at) a tip of the discharging cable 14. By connecting the charging plug 12 to an external power supply (not shown) via a charging cable (not shown), the battery apparatus 4 can be charged (recharged) by the external power supply, which may, e.g., be a commercial AC power supply. In addition, as shown in FIG. 3, by connecting the battery apparatus 4 to an electric work machine 52 via the discharging cable 14, the battery apparatus 4 can discharge (supply electric current) to the electric work machine 52. In the example shown in FIG. 3, the electric work machine 52 is a blower in which a battery pack (not shown) can be mounted on and demounted from a battery-pack mount part 52a. In the example shown in FIG. 3, an adapter 54 (instead of a battery pack) is mounted on the battery-pack mount part 52a of the electric work machine 52, and the discharging plug 16 is connected to the adapter 54. It is noted that the electric work machine 52 may be configured such that it is directly connectable to the discharging plug 16 without the adapter 54 intervening therebetween. In addition, the electric work machine 52 may be some other type of electric work machine (e.g., outer power equipment) such as, for example, a mowing machine (e.g., a lawn mower), a chain saw, or the like, or may be a so-called power tool such as a driver, a drill, or the like. The remaining-charge indication lamp 18 displays the amount of charge remaining in the battery apparatus 4 (or more specifically, in the battery cells contained in the battery apparatus 4). The remaining-charge indication button (switch) 20 switches the battery-remaining charge indication of the remaining-charge indication lamp 18 between ON and OFF.

Figure 4:
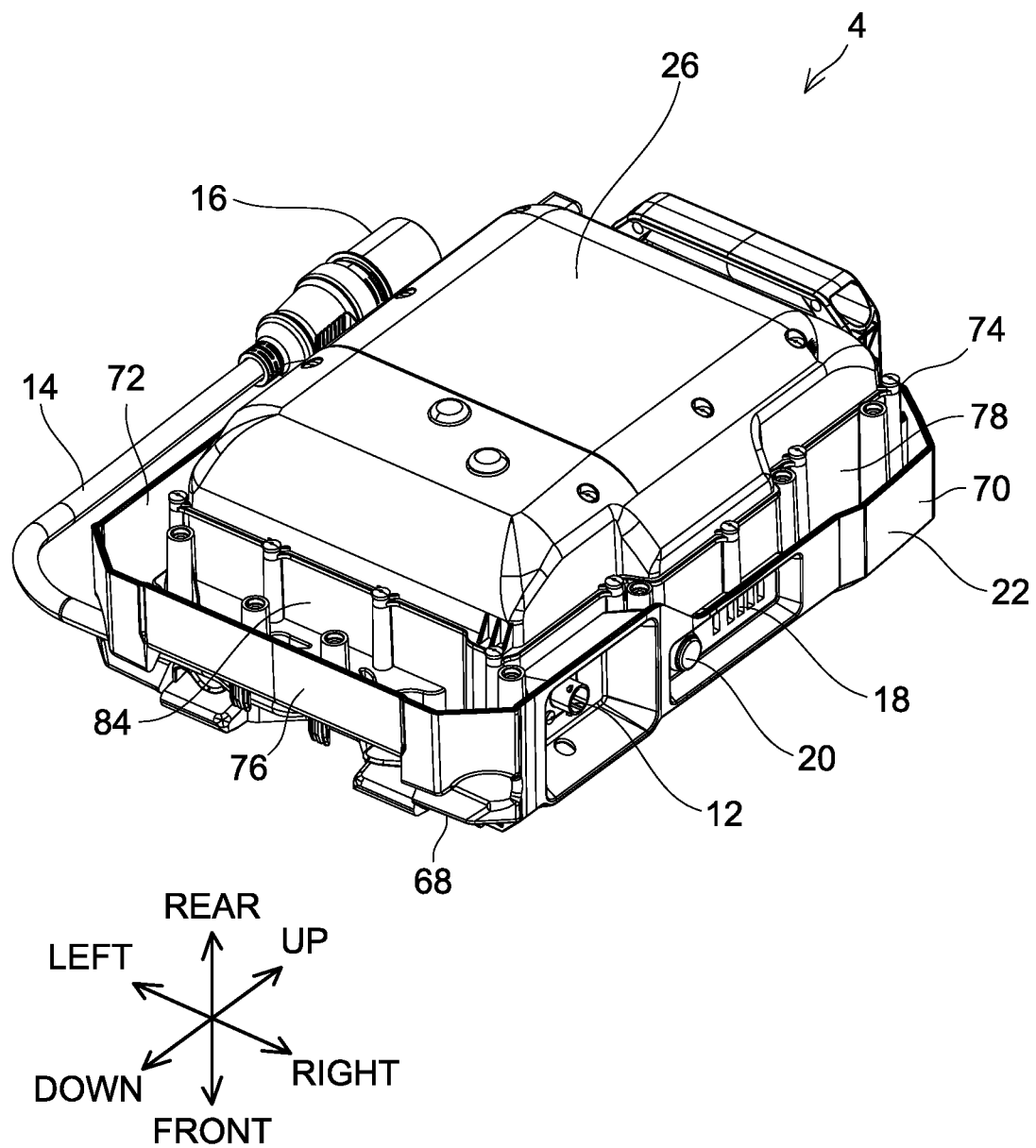
FIG. 4 is an oblique view that shows the state in which a rear-side casing 24 of the battery apparatus 4 has been removed, according to Working Example 1.

As shown in FIGS. 2 and 4, the battery apparatus 4 comprises a front-side casing (shell) 22, a rear-side casing (shell) 24, and an inner cover 26. The front-side casing 22, the rear-side casing 24, and the inner cover 26 all are members made of a resin or polymer (e.g., polycarbonate). It is noted that, hereinbelow, the front-side casing 22, the rear-side casing 24, and the inner cover 26 are also collectively referred to simply as a casing (housing) 28. The rear-side casing 24 and the inner cover 26 are each fixed to the front-side casing 22 by one or more fasteners. Hereinbelow, the space enclosed by the front-side casing 22 and the inner cover 26 is also referred to as a chamber 30 (refer to FIG. 5). A sealing member or seal, such as a gasket or elastomer, (not shown) is provided along the connection location between the front-side casing 22 and the inner cover 26. The chamber 30 is sealed from the exterior by the sealing member.

Figure 5:
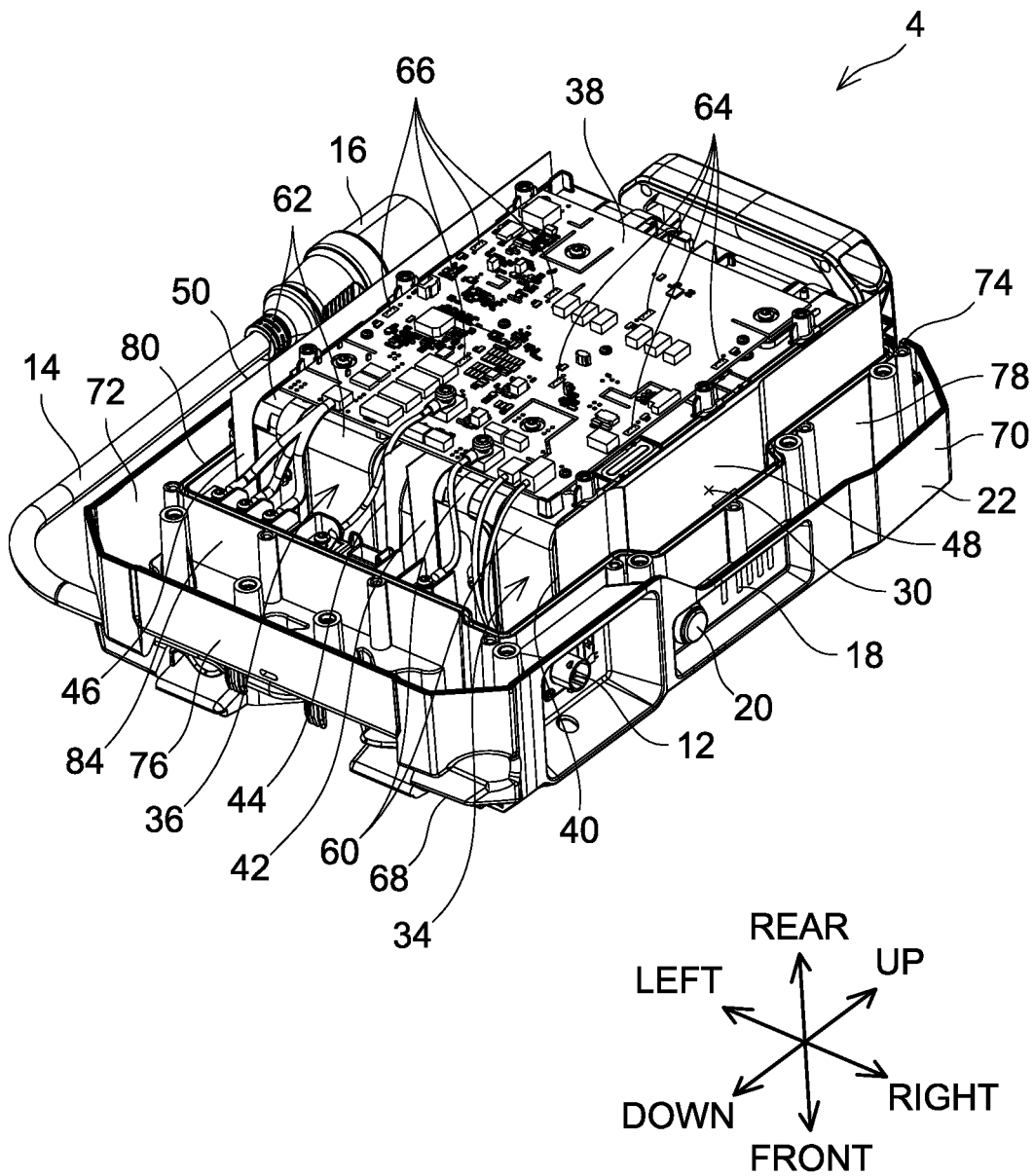
FIG. 5 is an oblique view that shows the state in which the rear-side casing 24 of the battery apparatus 4 and an inner cover 26 have been removed, according to Working Example 1.

As shown in FIG. 5, battery-cell modules 34, 36, a control circuit board 38, fire-extinguishing agents 40, 42, 44, 46, and flame-resistant members 48, 50 are housed in the chamber 30.

Figure 6:
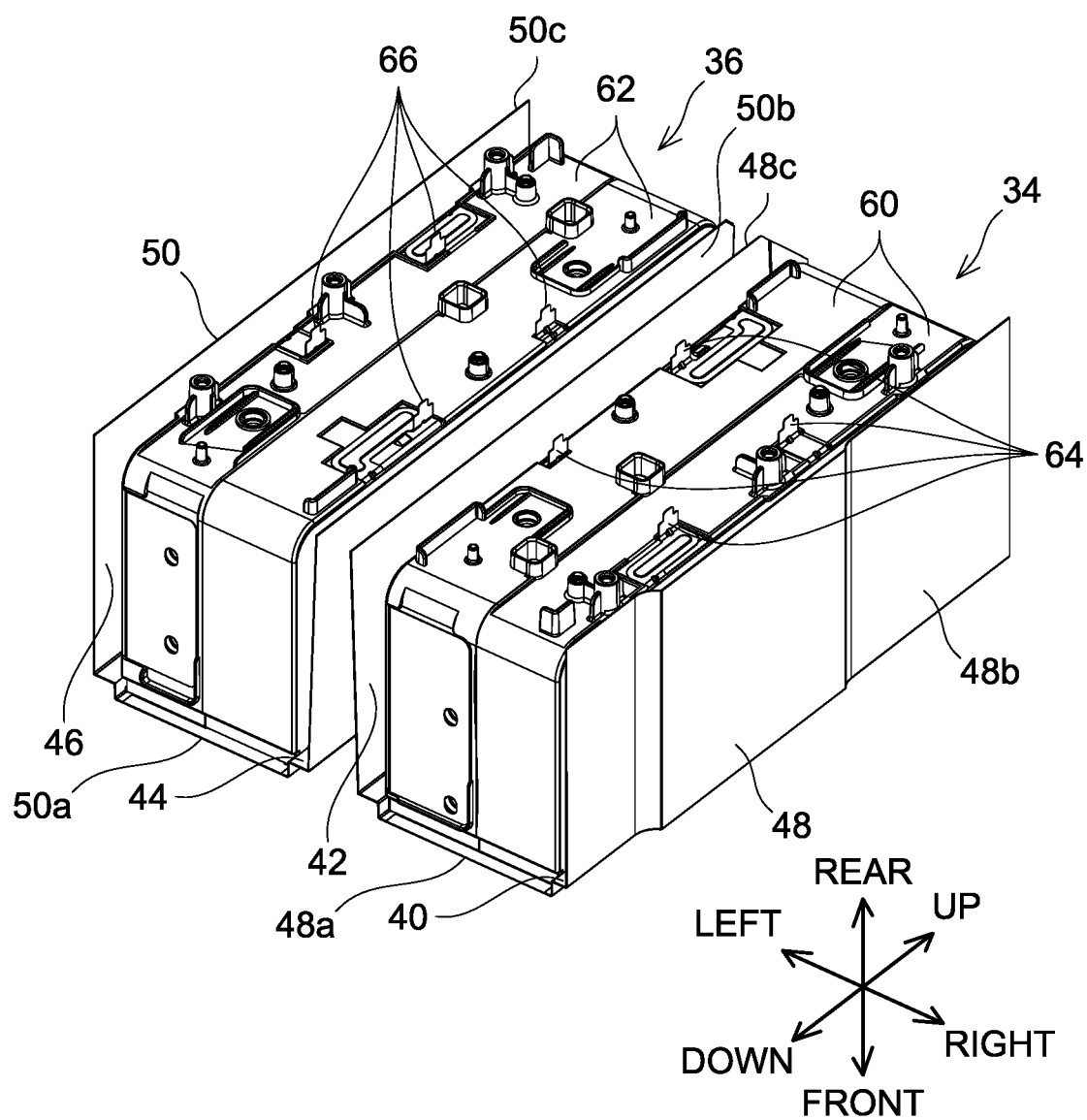
FIG. 6 is an oblique view that shows the positional relationship among battery-cell modules 34, 36, fire-extinguishing agents 40, 42, 44, 46, and flame-resistant members 48, 50 of the battery apparatus 4 according to Working Example 1.

As shown in FIG. 6, the battery-cell modules 34, 36 respectively comprise: battery cells 56, 58 (refer to FIG. 7); cell holders 60, 62, which are made of a resin or polymer (e.g., polycarbonate) and hold the battery cells 56, 58; and lead plates 64, 66, which electrically connect the battery cells 56, 58 to the control circuit board 38 (refer to FIG. 5). As shown in FIG. 5, the control circuit board 38 is fixed to rear surfaces of the cell holders 60, 62 by fasteners. The control circuit board 38 is, for example, a glass-epoxy substrate. In the following description, the term "lead plate" will be used in a manner that is synonymous with "connection tabs". It is noted that the term "lead" is being used in the sense of an "electrical lead" and not in the sense of the element lead (Pb). Thus, lead plates according to the present teachings may be made of any conductive metal or alloy, such as copper, copper alloy, aluminum, aluminum alloy, etc.

Figure 7:
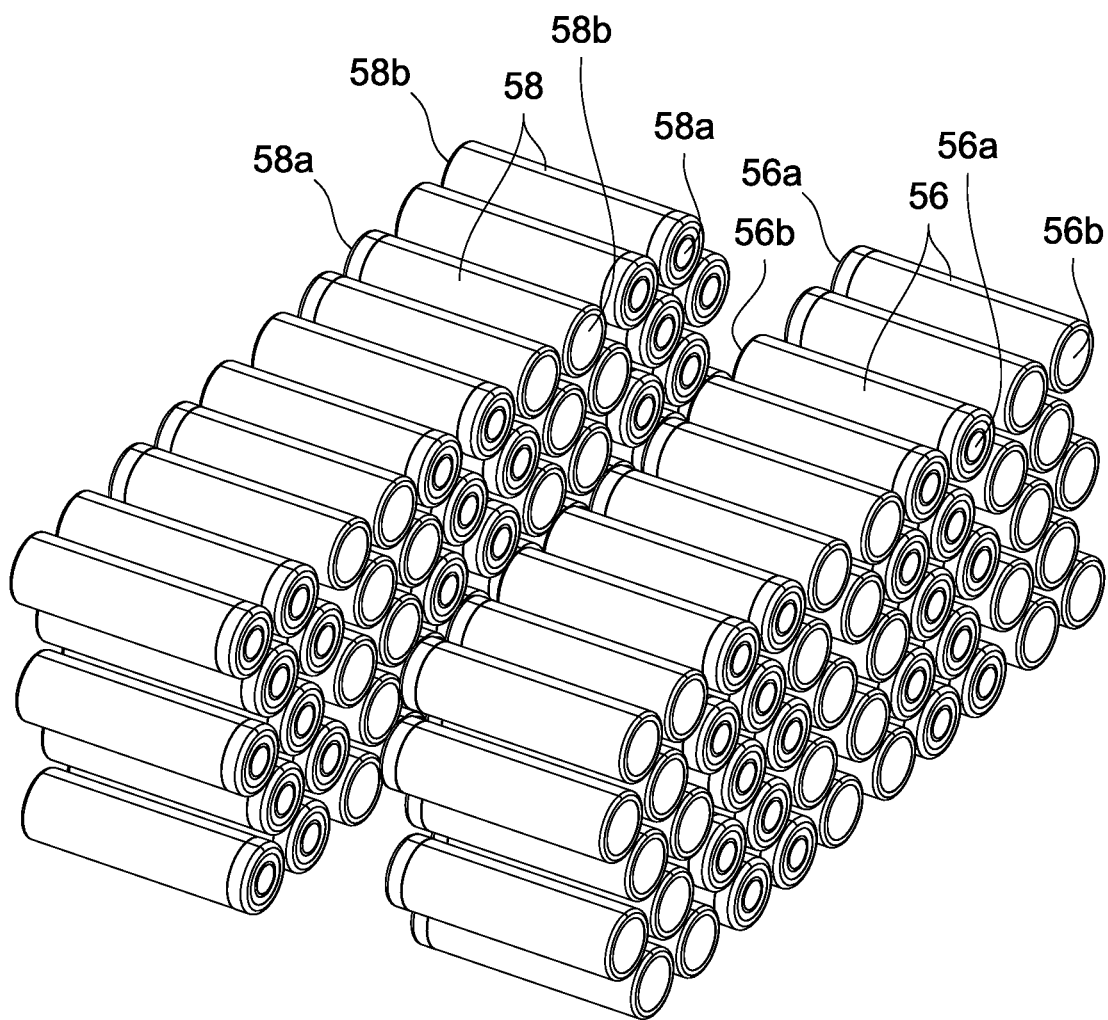
FIG. 7 is an oblique view of a plurality of battery cells 56, 58 of the battery apparatus 4 according to Working Example 1.
Figure 7:
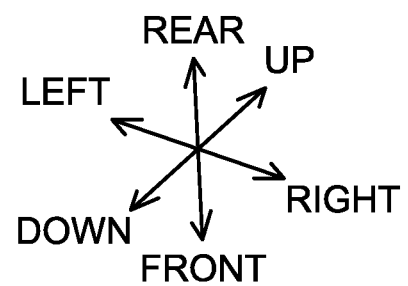

As shown in FIG. 7, each of the battery cells 56, 58 is a secondary (rechargeable) battery cell having, for example, a substantially circular-column shape, and is, for example, a lithium-ion battery cell. Each of the battery cells 56, 58 has, for example, the shape of an 18650-type cell, a volumetric-energy density of 729 Wh/liter, a rated capacity of 3.35 Ah, and a rated voltage of 3.6 V. It is noted that each of the battery cells 56, 58 may have a volumetric-energy density of 327 Wh/liter and/or may have a rated capacity of 1.5 Ah. Alternatively, each of the battery cells 56, 58 may have a volumetric-energy density of 436 Wh/liter and/or may have a rated capacity of 2 Ah. Alternatively, each of the battery cells 56, 58 may have a volumetric-energy density of 544 Wh/liter or may have a rated capacity of 2.5 Ah. Alternatively, each of the battery cells 56, 58 may have a volumetric-energy density of 653 Wh/liter and/or may have a rated capacity of 3 Ah. Alternatively, each of the battery cells 56, 58 may have the shape of a 21700-type cell, may have a volumetric-energy density of 594 Wh/liter, may have a rated capacity of 4 Ah, and/or may have a rated voltage of 3.6 V. It is noted that each of the battery cells 56, 58 is not limited to having a substantially circular-column shape and may be a so-called rectangular-prism type or may be a laminate type. With regard to the battery apparatus 4, each of the battery cells 56, 58 is charged or chargeable to an SOC (state of charge) of 90% or more. The plurality of battery cells 56, 58 respectively comprise positive electrodes 56a, 58a and negative electrodes 56b, 58b, which serve as electrodes. The positive electrodes 56a, 58a are disposed on one end surfaces of the battery cells 56, 58 in the longitudinal direction, and the negative electrodes 56b, 58b are disposed on the other end surfaces of the battery cells 56, 58 in the longitudinal direction. The battery cells 56, 58 are disposed lined up (in parallel) in the front-rear direction and the up-down direction such that their longitudinal direction is aligned in the left-right direction. In the present Working Example 1, the battery-cell module 34 comprises a total of fifty (50) of the battery cells 56, with 10 across in the up-down direction and five across in the front-rear direction, and the battery-cell module 36 comprises a total of 50 of the battery cells 58, with 10 across in the up-down direction and five across in the front-rear direction. Some of the battery cells 56, 58 are held by the cell holders 60, 62 such that the positive electrodes 56a, 58a are exposed at right surfaces of the cell holders 60, 62 and such that the negative electrodes 56b, 58b are exposed at left surfaces of the cell holders 60, 62. The remainder of the battery cells 56, 58 are held by the cell holders 60, 62 such that the positive electrodes 56a, 58a are exposed at the left surfaces of the cell holders 60, 62 and such that the negative electrodes 56b, 58b are exposed at the right surfaces of the cell holders 60, 62. The lead plates 64 (refer to FIG. 6) are provided on the right surface and the left surface of the battery-cell module 34, and each of the positive electrodes 56a and each of the negative electrodes 56b of the battery cells 56 are electrically connected to the control circuit board 38. The lead plates 66 (refer to FIG. 6) are provided on the right surface and the left surface of the battery-cell module 36, and each of the positive electrodes 58a and each of the negative electrodes 58b of the battery cells 58 are electrically connected to the control circuit board 38.

A battery apparatus 4 according to the present teachings, when embodied as a backpack type battery apparatus, may contain a number and type of battery cells such that the battery apparatus 4 as a whole as a nominal output voltage of at least 18 volts, more preferably at least 36 volts. The upper limit of the nominal voltage is not particularly limited, but may be, e.g., 100 volts, or 80 volts, or 60 volts. In addition or in the alternative, a battery apparatus 4 according to the present teachings, when embodied as a backpack type battery apparatus, may contain a number and type of battery cells such that the battery apparatus 4 as a whole has a nominal output capacity of at least 800 Watt hours, more preferably at least 1200 Watt hours. The upper limit of the nominal output capacity is not particularly limited, but may be, e.g., 5000 Watt hours, or 4000 Watt hours or 3000 Watt hours.

Figure 8:
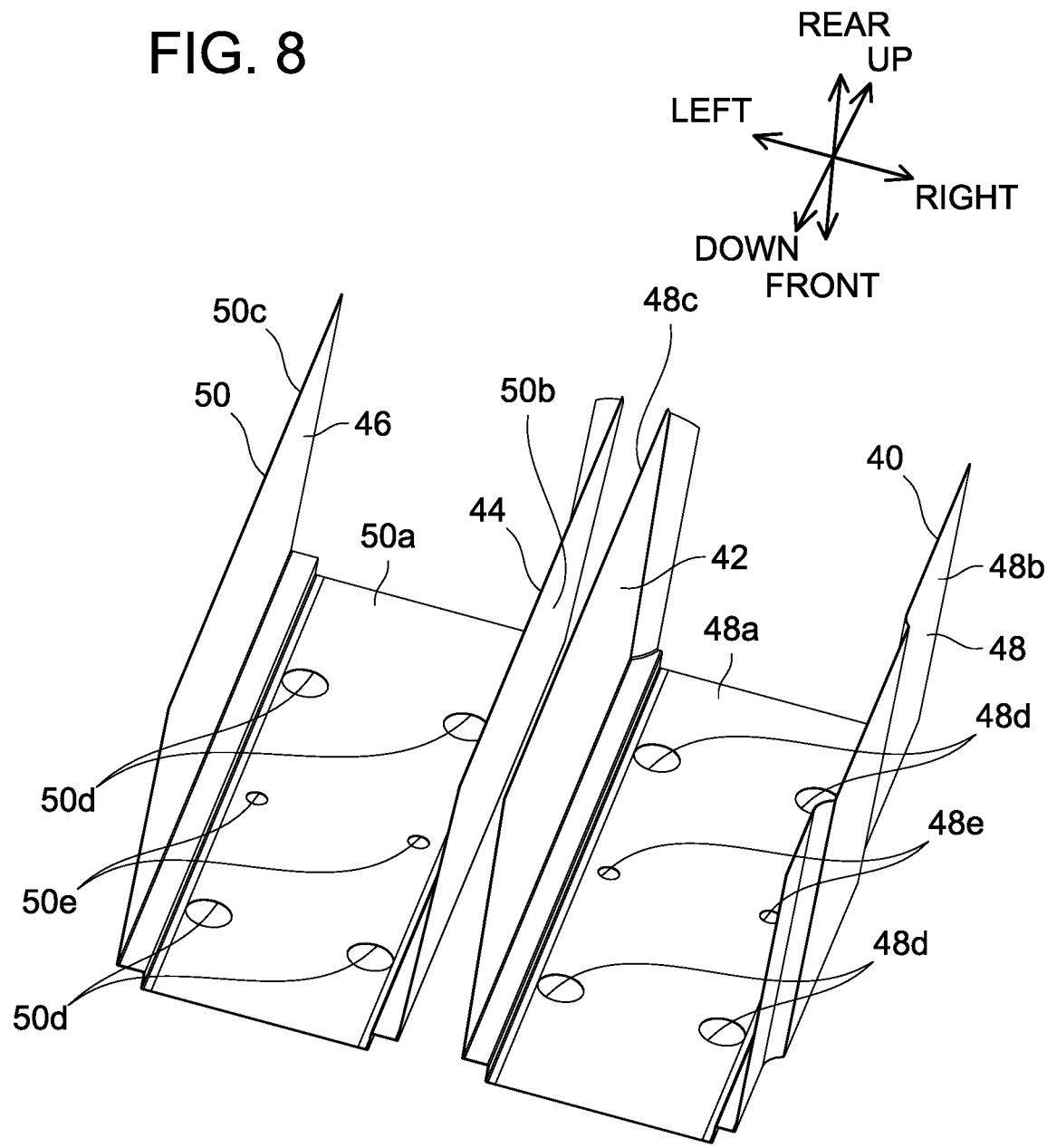
FIG. 8 is an oblique view of the fire-extinguishing agents 40, 42, 44, 46 and the flame-resistant members 48, 50 of the battery apparatus 4 according to Working Example 1.

As shown in FIG. 8, the fire-extinguishing agents 40, 42 are mounted on the flame-resistant member 48, and the fire-extinguishing agents 44, 46 are mounted on the flame-resistant member 50. The fire-extinguishing agents 40, 42, 44, 46 include components, one or more chemicals or a chemical composition that provide(s) (has/have) a fire-suppressing effect and/or a negative-catalyst effect with respect to combustion (e.g., a combustion inhibiting effect or a combustion suppressing effect). As possible components, chemicals, chemical compositions, etc. that provide (have) a fire-suppressing effect and/or a negative-catalyst effect with respect to combustion, the fire-extinguishing agents 40, 42, 44, 46 may include components, chemicals or chemical compositions that absorb combustion gases such as, for example, hydrogen, hydrogen sulfide, carbon monoxide, methane, ethane, propane, and/or ethylene. Alternatively, as other types of components, chemicals or chemical compositions that provide (have) a fire-suppressing effect and/or a negative-catalyst effect with respect to combustion, the fire-extinguishing agents 40, 42, 44, 46 may include components, chemicals or chemical compositions that inhibit or suppress the oxidation of flammable substances by generating sodium chloride, potassium chloride, sodium carbonate, potassium carbonate, sodium sulfate, potassium sulfate, or the like during (in response) combustion or heating. For example, and without limitation, the fire-extinguishing agent may be composed of, or comprise, a potassium compound, such as potassium chloride, potassium bicarbonate, or potassium allophanate, a sodium compound, such as sodium chloride or sodium bicarbonate, a halide, or a composition containing such a fire-extinguishing agent, e.g., Purple-K, which may contain a mixture of potassium bicarbonate, sodium bicarbonate, mica, Fuller's earth, amorphous silica and methyl hydrogen polysiloxane. The fire-extinguishing agents 40, 42, 44, 46 according to the present working example may be formed, e.g., by compacting a solid, powder-like, fire-extinguishing agent into a thin-plate shape. In the alternative, one or more fire-extinguishing agents may be bonded or otherwise attached to the outer side(s) of another thin-plate or sheet material, such as a metal, polymer, ceramic, glass, etc., which may or may not necessarily be a fire-resistant material or a fire-extinguishing agents itself. It is noted that the fire-extinguishing agents 40, 42, 44, 46 may be formed by filling a thin-film container with a gas or liquid fire-extinguishing agent.

Each of the flame-resistant members 48, 50 may be made of a material, e.g., a polymer material, whose limiting oxygen index is higher than the oxygen concentration in the atmosphere, and therefore tends not to combust or burn in normal or typical atmospheric conditions. For example, the limiting oxygen index of the flame-resistant members 48, 50 may be, for example, 23 or more, may be 27 or more, may be 32 or more, or may be 40 or more. The flame-resistant members 48, 50 may be composed of, for example, a flame-resistant chloroprene rubber (polychloroprene), which has a limiting oxygen index of, for example, 35. Other representative, non-limiting materials for constituting the flame-resistant members 48, 50 include, but are not limited to thermosetting resins, such as phenolic resins, silicone rubbers, and other types of fire-resistant halogenated elastomers; thermoplastic polymers, such as PVC (polyvinylchloride), CPVC (chlorinated polyvinyl chloride), polyamides, polyethersulfones, polycarbonates, polyethylene naphthalates, polyamideimides, polyether ether ketones, polyetherimides, or 2,2'-m-phenylene-5,5'-bibenzimidazole; super engineering plastics, such as polyphenylene sulfides (PPS); Kevlar (poly(azanediyl-1,4-phenyleneazanediylterephthaloyl); Nomex; halogenated polymers, such as fluorinated ethylene propylene, poly(ethylene-chlorotrifluorethylene) or polytetrafluoroethylenes; ceramics and glass. The limiting oxygen index of the flame-resistant members 48, 50 may be higher than the limiting oxygen index (e.g., 23) of the casing 28. The flame-resistant members 48, 50 of the present working example are formed into a thin-plate shape or sheet shape. The entire thin-plate or sheet may be composed of one or more of the fire-resistant materials, or one or more fire-resistant materials may be bonded or otherwise attached to the outer side(s) of another thin-plate or sheet material, such as a metal, polymer, ceramic, glass, etc., which may or may not necessarily be a fire-resistant material itself. The flame-resistant member 48 comprises: a front part (front sheet) 48*a*, which is disposed opposing the front surface of the battery-cell module 34; a right part (right sheet) 48*b*, which is disposed opposing the right surface of the battery-cell module 34; and a left part (left sheet) 48*c*, which is disposed opposing the left surface of the battery-cell module 34. The fire-extinguishing agent 40 is mounted on the left surface and the upper surface of the right part 48*b* of the flame-resistant member 48. The fire-extinguishing agent 42 is mounted on the right surface and the upper surface of the left part 48*c* of the flame-resistant member 48. In the present working example, the fire-extinguishing agents 40, 42 are adhered to the flame-resistant member 48 by adhesive tape. The flame-resistant member 50 comprises: a front part (front sheet) 50*a*, which is disposed opposing the front surface of the battery-cell module 36; a right part (right sheet) 50*b*, which is disposed opposing the right surface of the battery-cell module 36; and a left part (left sheet) 50*c*, which is disposed opposing the left surface of the battery-cell module 36. The fire-extinguishing agent 44 is mounted on the left surface and the upper surface of the right part 50*b* of the flame-resistant member 50. The fire-extinguishing agent 46 is mounted on the right surface and the upper surface of the left part 50*c*. In the present working example, the fire-extinguishing agents 44, 46 are adhered to the flame-resistant member 50 by adhesive tape.

Figure 9:
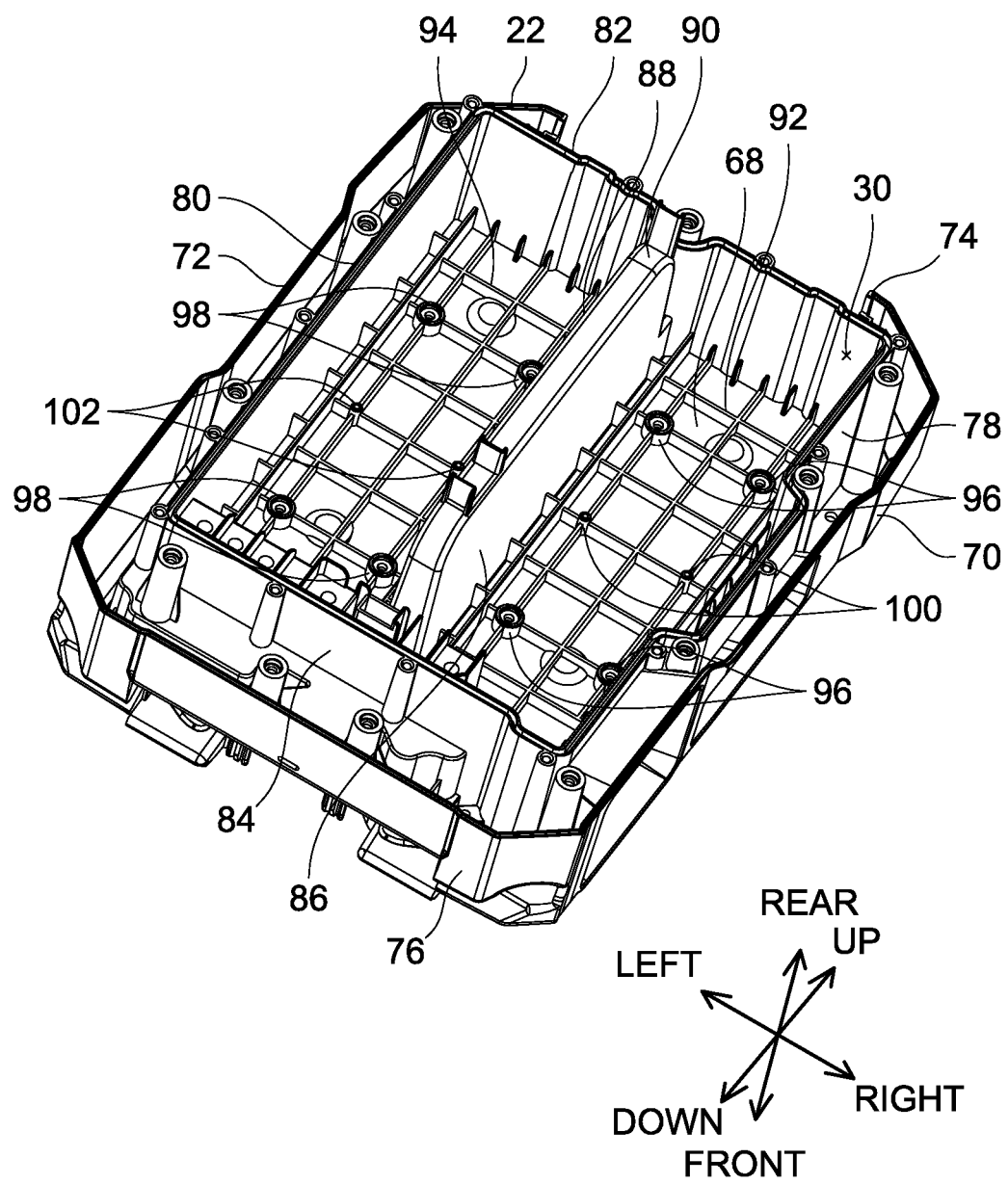
FIG. 9 is an oblique view of a front-side casing 22 of the battery apparatus 4 according to Working Example 1.

As shown in FIG. 9, the front-side casing 22 comprises: a front plate 68, which opposes the backpack frame 6 when the battery apparatus 4 is mounted on the backpack frame 6; a right-outer plate 70, which extends rearward from the right end of the front plate 68; a left-outer plate 72, which extends rearward from the left end of the front plate 68; an upper-outer plate 74, which extends rearward from the upper end of the front plate 68; and a lower-outer plate 76, which extends rearward from the lower end of the front plate 68. The external shape of the front-side casing 22 is defined by the front plate 68, the right-outer plate 70, the left-outer plate 72, the upper-outer plate 74, and the lower-outer plate 76. The front-side casing 22 further comprises a right-inner plate 78, a left-inner plate 80, an upper-inner plate 82, and a lower-inner plate 84, which extend rearward from the rear surface of the front plate 68. The right-inner plate 78, the left-inner plate 80, the upper-inner plate 82, and the lower-inner plate 84 define the inner cover 26 (refer to FIG. 4) and the chamber 30. The front-side casing 22 further comprises: a right-center plate 86 and a left-center plate 88, which extend rearward from the rear surface of the front plate 68; and a coupling plate 90, which couples the upper end, the rear end, and the lower end of the right-center plate 86 and the left-center plate 88. The right-center plate 86 extends rearward from the right edge of a slit 68*a* (refer to FIG. 11), which is formed in the front plate 68 and extends in the up-down direction; and the left-center plate 88 extends rearward from the left edge of the slit 68*a*.

The battery-cell module 34 (refer to FIG. 6) is disposed, rightward of the right-center plate 86, in the chamber 30 when the battery-cell module 34 is mounted on the front-side casing 22. In this state, the front plate 68 opposes the front surface of the battery-cell module 34, the right-inner plate 78 opposes the right surface of the battery-cell module 34, the right-center plate 86 opposes the left surface of the battery-cell module 34, the upper-inner plate 82 opposes the upper surface of the battery-cell module 34, and the lower-inner plate 84 opposes the lower surface of the battery-cell module 34. The battery-cell module 36 (refer to FIG. 6) is disposed, leftward of the left-center plate 88, in the chamber 30 when the battery-cell module 36 is mounted on the front-side casing 22. In this state, the front plate 68 opposes the front surface of the battery-cell module 36, the left-center plate 88 opposes the right surface of the battery-cell module 36, the left-inner plate 80 opposes the left surface of the battery-cell module 36, the upper-inner plate 82 opposes the upper surface of the battery-cell module 36, and the lower-inner plate 84 opposes the lower surface of the battery-cell module 36.

On the rear surface of the front plate 68 are formed: ribs 92, 94, which protrude rearward, extend in the up-down direction and the left-right direction, and have a lattice shape; fastening bosses 96, 98, which protrude rearward; and positioning bosses 100, 102, which protrude rearward. The fastening bosses 96, 98 and the positioning bosses 100, 102 are respectively disposed at intersection points of the lattice-shaped ribs 92, 94. As shown in FIG. 8, through holes 48*d*, whose locations and shapes correspond to those of the fastening bosses 96, and through holes 48*e*, whose locations and shapes correspond to those of the positioning bosses 100, are formed in the front part 48*a* of the flame-resistant member 48. The flame-resistant member 48 is mounted on the front-side casing 22 in the state in which the fastening bosses 96 have been passed through the through holes 48*d* and the positioning bosses 100 have been passed through the through holes 48*e*. Through holes 50*d*, whose locations and shapes correspond to those of the fastening bosses 98, and through holes 50*e*, whose locations and shapes correspond to those of the positioning bosses 102, are formed in the front part 50*a* of the flame-resistant member 50. The flame-resistant member 50 is mounted on the front-side casing 22 in the state in which the fastening bosses 98 have been passed through the through holes 50*d* and the positioning bosses 102 have been passed through the through holes 50*e*.

Figure 10:
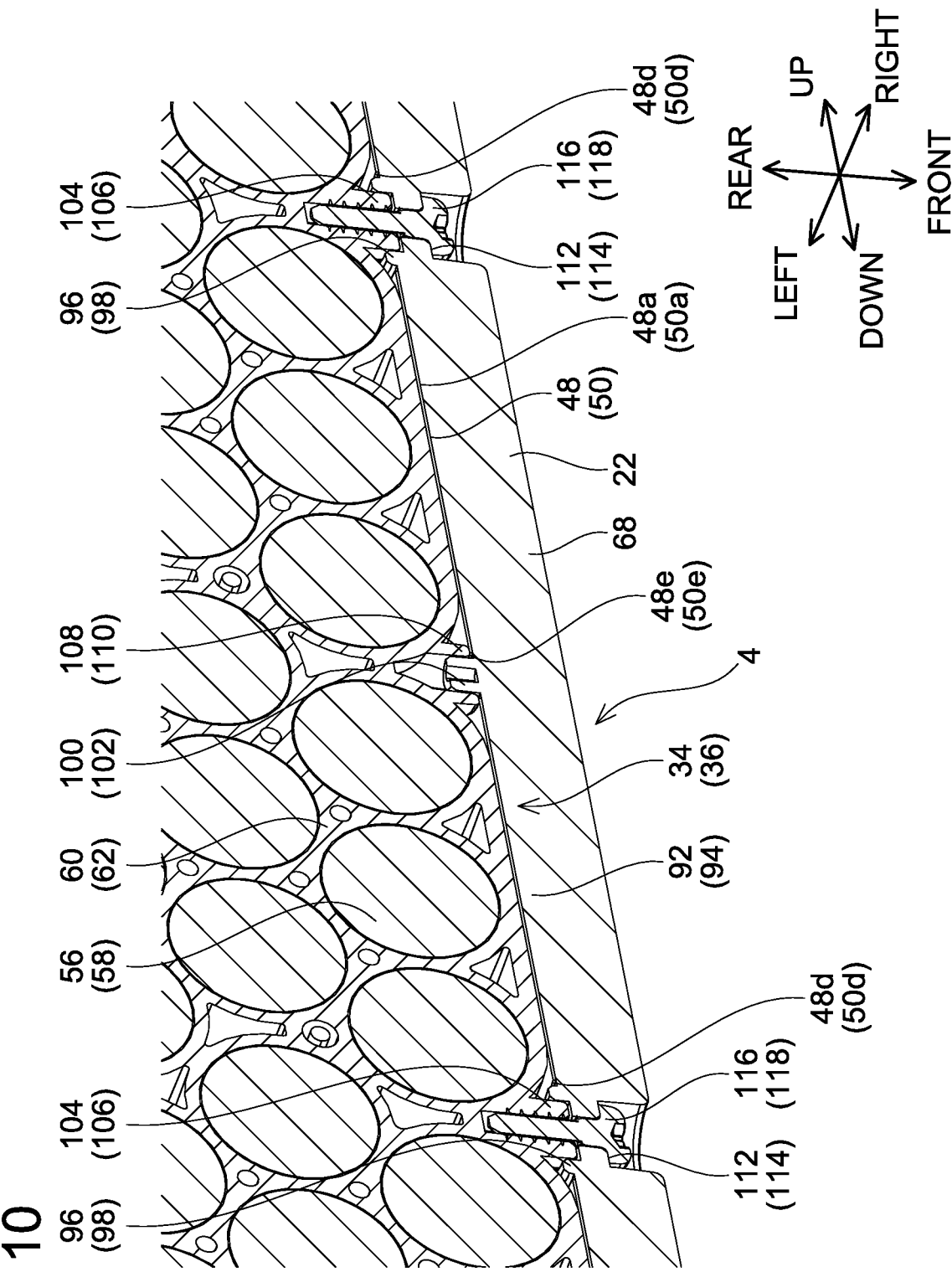
FIG. 10 is a partial, longitudinal, cross-sectional view of the battery apparatus 4 according to Working Example 1.
Figure 11:
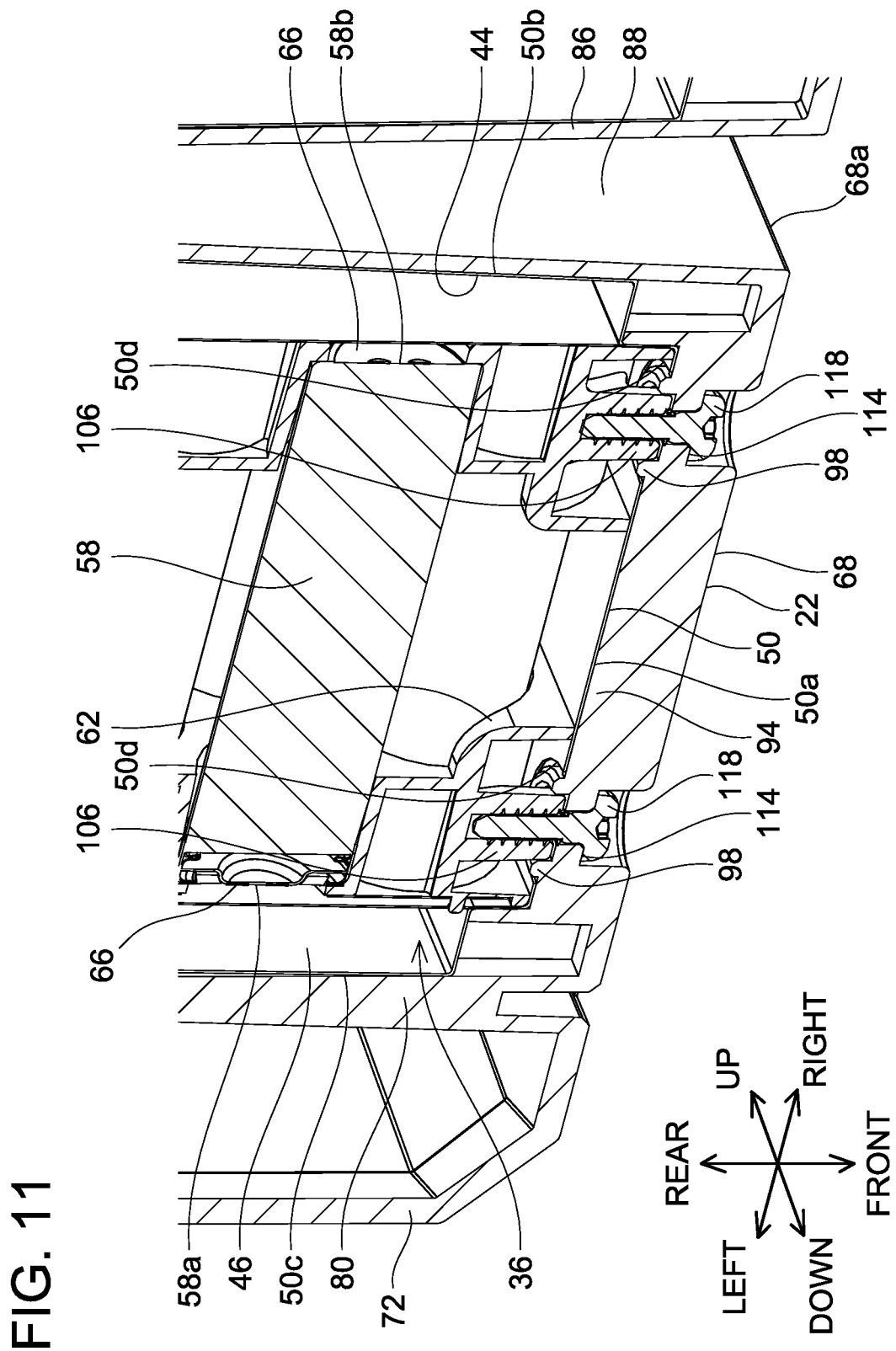
FIG. 11 is a partial, transverse, cross-sectional view of the battery apparatus 4 according to Working Example 1.

As shown in FIGS. 10 and 11, screw bosses 104, 106, which protrude forward, and positioning bosses 108, 110, which protrude forward, are formed on (in) the front surfaces of the cell holders 60, 62 of the battery-cell modules 34, 36. The screw bosses 104, 106 are disposed opposing the fastening bosses 96, 98 of the front-side casing 22, and the positioning bosses 108, 110 are disposed opposing the positioning bosses 100, 102 of the front-side casing 22. The outer diameter of the screw bosses 104, 106 is slightly smaller than the inner diameter of the fastening bosses 96, 98 of the front-side casing 22. The inner diameter of the positioning bosses 108, 110 is slightly larger than the outer diameter of the positioning bosses 100, 102 of the front-side casing 22. When the battery-cell modules 34, 36 are to be mounted on the front-side casing 22, the screw bosses 104, 106 of the cell holders 60, 62 enter the fastening bosses 96, 98 of the front plate 68, and the positioning bosses 108, 110 of the front plate 68 enter the positioning bosses 100, 102 of the cell holders 60, 62; thereby, the cell holders 60, 62 are positioned relative to the front-side casing 22. Countersink holes 112, 114, which correspond to the fastening bosses 96, 98, are formed in the front surface of the front-side casing 22. Screws 116, 118 are fitted in the countersink holes 112, 114. The screws 116, 118 pass through the front plate 68 of the front-side casing 22 and are screwed into the screw bosses 104, 106 of the cell holders 60, 62; thereby, the cell holders 60, 62 are fixed to the front-side casing 22. In the state in which the cell holders 60, 62 are fixed to the front-side casing 22, the front part 48*a* of the flame-resistant member 48 is interposed and held by the cell holders 60 and the rib 92 of the front-side casing 22, and the front part 50*a* of the flame-resistant member 50 is interposed and held by the cell holders 62 and the rib 94 of the front-side casing 22.

It is noted that the fire-extinguishing agents 40, 42, 44, 46 do not have to be adhered to the flame-resistant members 48, 50. In addition or in the alternative, the flame-resistant members 48, 50 do not have to engage with the fastening bosses 96, 98, the positioning bosses 100, 102, or the like of the front-side casing 22, and do not have to be interposed between and held by the front-side casing 22 and the cell holders 60, 62. For example, the fire-extinguishing agents 40, 42, 44, 46 and/or the flame-resistant members 48, 50 may be adhered to the cell holders 60, 62 by adhesive tape or may be adhered to the front-side casing 22 by adhesive tape.

There are situations in which, owing to inappropriate handling of the battery apparatus 4, the battery cells 56, 58 may ignite and consequently flames may be emitted, e.g., from the positive electrodes 56*a*, 58*a*. In such situations, with regard to the battery apparatus 4 of the present working example, flames from the battery cells 56, 58 will be extinguished by the fire-suppressing effect and/or the negative-catalyst effect (combusting inhibiting effect) of the fire-extinguishing agents 40, 42, 44, 46. According to the battery apparatus 4 of the present working example, even if the battery cells 56, 58 have ignited, they can be rapidly extinguished. In addition, with regard to the battery apparatus 4 of the present working example, because the chamber 30, which houses the battery cells 56, 58 and the fire-extinguishing agents 40, 42, 44, 46, is sealed, even if one or more of the battery cells 56, 58 has (have) ignited, it is possible to inhibit or block the leakage of components of the fire-extinguishing agents 40, 42, 44, 46 out to the exterior of the chamber 30. The flames of the battery cells 56, 58 can be rapidly extinguished.

With regard to the battery apparatus 4 of the present working example, the fire-extinguishing agent 40 and the right part 48*b* of the flame-resistant member 48 are interposed between the positive electrodes 56*a* of the battery cells 56 and the right-inner plate 78 of the front-side casing 22; the fire-extinguishing agent 42 and the left part 48*c* of the flame-resistant member 48 are interposed between the positive electrodes 56*a* of the battery cells 56 and the right-center plate 86 of the front-side casing 22. In addition, the fire-extinguishing agent 44 and the right part 50*b* of the flame-resistant member 50 are interposed between the positive electrodes 58*a* of the battery cells 58 and the left-center plate 88 of the front-side casing 22; the fire-extinguishing agent 46 and the left part 50*c* of the flame-resistant member 50 are interposed between the positive electrodes 58*a* of the battery cells 58 and the left-inner plate 80 of the front-side casing 22. By adopting such a configuration, even if flames that have ignited from one or more of the battery cells 56, 58 break through the fire-extinguishing agents 40, 42, 44, 46, the flames are blocked by the flame-resistant members 48, 50, and therefore it is possible to inhibit, suppress or block the flames from reaching the right-inner plate 78, the left-inner plate 80, the right-center plate 86, and the left-center plate 88 of the front-side casing 22.

With regard to the battery apparatus 4 of the present Working Example 1, the front parts (sheets) 48*a*, 50*a* of the flame-resistant members 48, 50 are interposed between the battery-cell modules 34, 36 and the front plate 68 of the front-side casing 22. By adopting such a configuration, even if one or more of the battery cells 56, 58 has (have) ignited, it is possible to inhibit, suppress or block the flames from reaching the front plate 68 of the front-side casing 22 and thereby limit or prevent damage to the backpack frame 6 of the backpack-type power supply 2.

It is noted that the fire-extinguishing agents 40, 42, 44, 46 may be sealed by a pair of laminate films that respectively cover the front surfaces and rear surfaces of the fire-extinguishing agents 40, 42, 44, 46. In this situation, the fire-extinguishing agents 40, 42, 44, 46 can be protected, and the handleability of the fire-extinguishing agents 40, 42, 44, 46 when the battery apparatus 4 is being manufactured can be improved. In addition, the flame-resistant members 48, 50 may be sealed by a pair of laminate films that respectively cover the front surfaces and rear surfaces of the flame-resistant members 48, 50. In this situation, the flame-resistant members 48, 50 can be protected and the handleability of the flame-resistant members 48, 50 when the battery apparatus 4 is being manufactured can be improved. In addition, in the state in which the fire-extinguishing agents 40, 42, 44, 46 are adhered to the flame-resistant members 48, 50 by an adhesive agent, the flame-resistant members 48, 50 and the fire-extinguishing agents 40, 42, 44, 46 may be sealed together by a pair of laminate films that respectively cover the front surfaces and rear surfaces thereof. The above-mentioned laminate films may be composed of, for example, polyethylene terephthalate (PET).

As described above, in one or more embodiments, the battery apparatus 4 comprises: the battery cells 56, 58; the fire-extinguishing agents 40, 42, 44, 46, which include a component, chemical or composition that provides (has) a fire-suppressing effect and/or a negative-catalyst effect with respect to combustion (combustion inhibiting or suppressing effect); the flame-resistant members 48, 50, whose limiting oxygen index is higher than the oxygen concentration in the atmosphere; and the casing (housing) 28, which is made of a resin (polymer) and houses the battery cells 56, 58, the fire-extinguishing agents 40, 42, 44, 46, and the flame-resistant members 48, 50. The fire-extinguishing agents 40, 42, 44, 46 are interposed between the battery cells 56, 58 and the casing 28. The flame-resistant members 48, 50 are interposed between the fire-extinguishing agents 40, 42, 44, 46 and the casing 28.

According to the above-mentioned configuration, in the event that the battery cells 56, 58 have been subject to inappropriate handling and consequently have ignited, the fire can be rapidly extinguished by the fire-suppressing effect and/or the negative-catalyst effect of the fire-extinguishing agents 40, 42, 44, 46. In addition, according to the above-mentioned configuration, even if flames emitted from the battery cells 56, 58 of the battery apparatus 4 have broken through the fire-extinguishing agents 40, 42, 44, 46, the flames are blocked by the flame-resistant members 48, 50, and therefore it is possible to inhibit, suppress or block the flames from reaching the casing 28.

In one or more embodiments, the battery cells 56, 58 have a substantially circular-column shape. The fire-extinguishing agents 40, 42, 44, 46 and the flame-resistant members 48, 50 are interposed between end surfaces of the battery cells 56, 58 in the longitudinal direction and the casing 28.

If the battery cells 56, 58 having a substantially circular-column shape have ignited, flames are likely to extend (spread, grow) from one or both of the end surfaces of the battery cells 56, 58. According to the above-mentioned configuration, in the event that the battery cells 56, 58 have ignited, the fire-extinguishing agents 40, 42, 44, 46 are directly exposed to the flames, and thereby the fire-suppressing effect and/or the negative-catalyst effect can be rapidly exhibited. If the battery cells 56, 58 have been subjected to inappropriate handling and/or usage and consequently have ignited, the fire can be rapidly extinguished. In addition, according to the above-mentioned configuration, even if flames extending from the end surface(s) of the battery cells 56, 58 break through the fire-extinguishing agents 40, 42, 44, 46, the flames are blocked by the flame-resistant members 48, 50, and therefore it is possible to inhibit, suppress or block the flames from reaching the casing 28.

In one or more embodiments, the battery apparatus 4 further comprises the cell holders (battery cell holders) 60, 62, which respectively hold the battery cells 56, 58. The battery cells 56, 58 are respectively held by the cell holders 60, 62 such that the end surfaces in the longitudinal direction are exposed at opposite side surfaces of the cell holders 60, 62. The flame-resistant members 48, 50 cover the entirety of the opposite side surfaces of the cell holders 60, 62.

According to the above-mentioned configuration, because the entirety of the opposite side surfaces of the cell holders 60, 62, to which the end surfaces of the battery cells 56, 58 are respectively exposed, is covered by the flame-resistant members 48, 50, it is possible to inhibit, suppress or block flames extending (emanating) from one or both of the end surfaces of the battery cells 56, 58 from reaching the casing 28.

In one or more embodiments, the flame-resistant members 48, 50 are interposed between and held by the cell holders 60, 62 and the casing 28.

According to the above-mentioned configuration, when the battery apparatus 4 is used by being carried around, the possibility of adverse mispositioning (inappropriate shifting or displacement) of the flame-resistant members 48, 50 can be reduced.

In one or more embodiments, the casing 28 is mountable on and demountable from the backpack frame 6, to which the shoulder belts 8 are attached. The flame-resistant members 48, 50 are interposed between a portion of the battery apparatus that opposes the backpack frame 6 of the casing 28 and the battery cells 56, 58.

According to the above-mentioned configuration, if the battery cells 56, 58 have been subjected to inappropriate handling and/or usage and consequently have ignited, it is possible to inhibit, suppress or block flames from reaching the portion opposing the backpack frame 6 of the casing 28.

In one or more embodiments, the flame-resistant members 48, 50 engage with the casing 28.

According to the above-mentioned configuration, when the battery apparatus 4 is used by being carried around, the possibility of adverse mispositioning (inappropriate shifting or displacement) of the flame-resistant members 48, 50 can be reduced.

In one or more embodiments, the casing 28 comprises the fastening bosses 96, 98 and the positioning bosses 100, 102 (examples of bosses) that protrude inward from an inner surface of the casing 28. The flame-resistant members 48, 50 have the through holes 48$d$, 50$d$, 48$e$, 50$e$ corresponding to the fastening bosses 96, 98 and the positioning bosses 100, 102. By inserting the fastening bosses 96, 98 and the positioning bosses 100, 102 into the through holes 48$d$, 50$d$, 48$e$, 50$e$, the flame-resistant members 48, 50 become engaged with the casing 28.

According to the above-mentioned configuration, because the fastening bosses 96, 98 and the positioning bosses 100, 102, which are provided on the casing 28, are used, the flame-resistant members 48, 50 can be caused to engage with the casing 28.

In one or more embodiments, the flame-resistant members 48, 50 are adhered to the casing 28.

According to the above-mentioned configuration, when the battery apparatus 4 is used by being carried around, the possibility of adverse mispositioning (inappropriate shifting or displacement) relative to the casing 28 of the flame-resistant members 48, 50 can be reduced.

In one or more embodiments, the flame-resistant members 48, 50 are adhered to the fire-extinguishing agents 40, 42, 44, 46.

According to the above-mentioned configuration, when the battery apparatus 4 is used by being carried around, the possibility of adverse mispositioning (inappropriate shifting or displacement) relative to the fire-extinguishing agents 40, 42, 44, 46 of the flame-resistant members 48, 50 can be reduced.

In one or more embodiments, the battery apparatus 4 further comprises the laminate films (example of the protective member), which respectively cover the flame-resistant members 48, 50.

According to the above-mentioned configuration, even in situations such as in the event that the battery apparatus 4 has been subjected to an impact or water has penetrated into the interior of the battery apparatus 4, the flame-resistant members 48, 50 can be protected.

In one or more embodiments, the laminate films cover both the flame-resistant members 48, 50 and the fire-extinguishing agents 40, 42, 44, 46.

According to the above-mentioned configuration, even in situations such as in the event that the battery apparatus 4 has been subjected to an impact or water has penetrated into the interior of the battery apparatus 4, the flame-resistant members 48, 50 and the fire-extinguishing agents 40, 42, 44, 46 can be protected.

In one or more embodiments, the battery cells 56, 58 are charged or are chargeable to an SOC (state of charge) of 90% or more.

In the state in which the SOC of the battery cells 56, 58 is high, there is a risk that the battery cells 56, 58 will burn aggressively in case the battery cells 56, 58 ignite. According to the above-mentioned configuration, if the battery cells 56, 58 have been subjected to inappropriate handling and/or usage and consequently have ignited, adverse aggressive burning can be inhibited or suppressed. In addition, even if the battery cells 56, 58 have ignited, it is possible to inhibit, suppress or block flames from adversely reaching the casing 28.

In one or more embodiments, the energy density of the battery cells 56, 58 is 300 Wh/liter or more.

If the energy density of the battery cells 56, 58 is high, then there is a risk that, in the event that the battery cells 56, 58 have ignited, the battery cells 56, 58 will burn aggressively. According to the above-mentioned configuration, if the battery cells 56, 58 have been subjected to inappropriate handling and/or usage and consequently have ignited, adverse aggressive burning can be inhibited or suppressed. In addition, even if the battery cells 56, 58 have ignited, it is possible to inhibit, suppress or block flames from adversely reaching the casing 28.

In one or more embodiments, the battery cells 56, 58 are lithium-ion battery cells.

The risk that a lithium-ion battery cell will ignite, owing to a variety of causes, is higher than in other types (battery chemistries) of battery cells. According to the above-mentioned configuration, even if the lithium-ion battery cells have been subjected to inappropriate handling and/or usage and consequently have ignited, the fire can be rapidly extinguished. In addition, even if the lithium-ion battery cells have ignited, it is possible to inhibit, suppress or block flames from adversely reaching the casing 28.

Working Example 2

Figure 12:
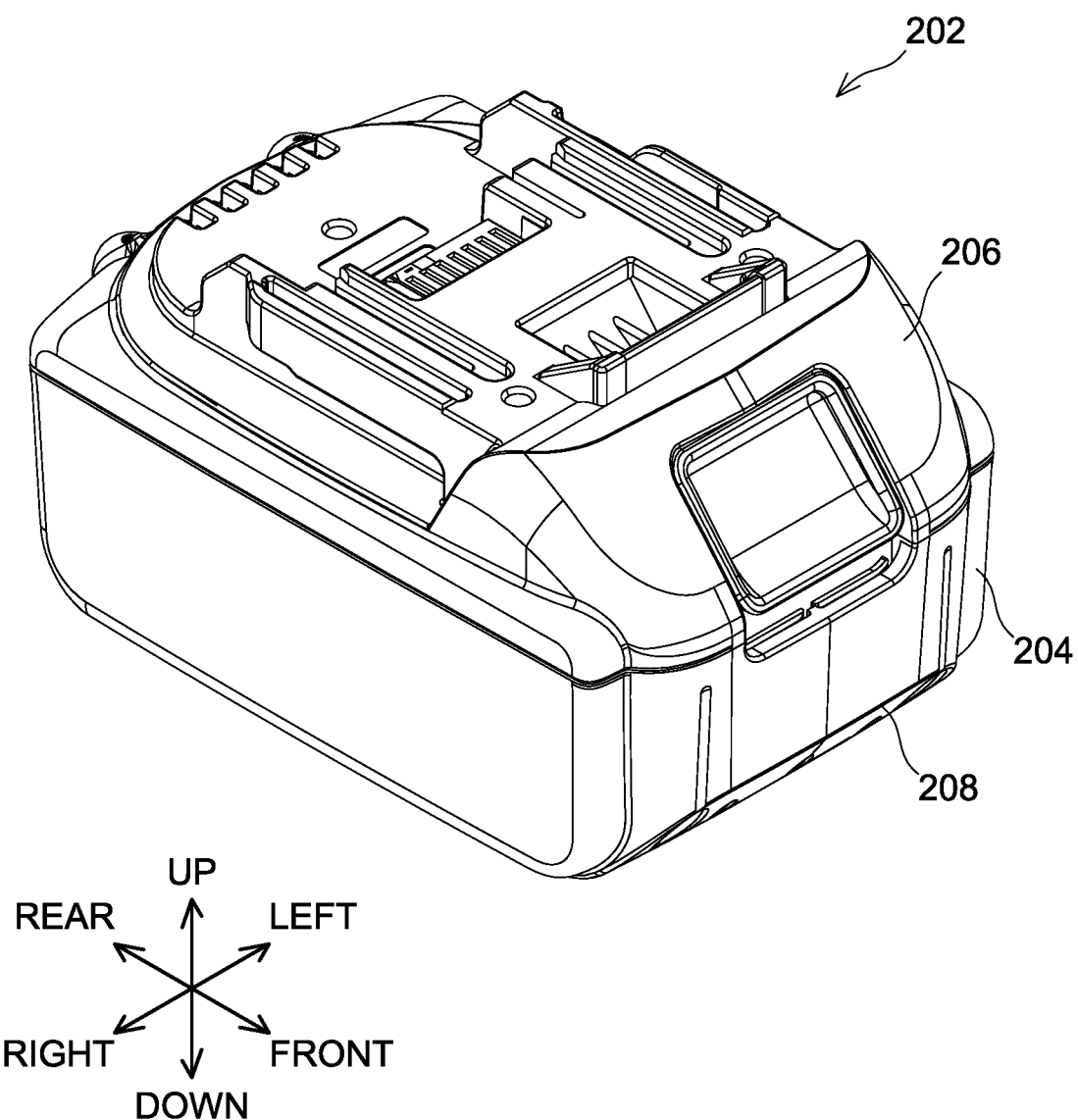
FIG. 12 is an oblique view of a battery pack 202 according to Working Example 2.

A battery pack 202 of the present Working Example 2, which is shown in FIG. 12, is used by being mounted on the battery-pack mount part 52a of the electric work machine 52 (refer to FIG. 3). The electric work machine 52 may be a blower as shown in FIG. 3, or it may be some other electric work machine such as a mowing machine (lawn mower) or a chain saw (e.g., a type of outdoor power equipment), or it may be a power tool such as a driver or a drill. The battery pack 202 can be mounted on and demounted from the electric work machine 52 by being slid in a prescribed sliding direction relative to the electric work machine 52. Hereinbelow, the direction in which the battery pack 202 is slid when the battery pack 202 is being mounted on the electric work machine 52 is called the rear direction, and the direction in which the battery pack 202 is slid when the battery pack 202 is being removed from the electric work machine 52 is called the forward direction. In addition, in the state in which the battery pack 202 is mounted on the electric work machine 52, the direction, viewed from the battery pack 202, in which the electric work machine 52 is located is called the upward direction, and the direction the reverse of the upward direction is called the downward direction. Furthermore, the direction orthogonal to the front-rear direction and the up-down direction is called the left-right direction.

As shown in FIG. 12, the battery pack 202 comprises a lower-side casing 204 and an upper-side casing 206. The lower-side casing 204 and the upper-side casing 206 are both members made of a resin or polymer (e.g., polycarbonate). It is noted that, hereinbelow, the lower-side casing 204 and the upper-side casing 206 are collectively also called simply a casing (housing) 208. The upper-side casing 206 is fixed to the lower-side casing 204 by a fastener.

Figure 13:
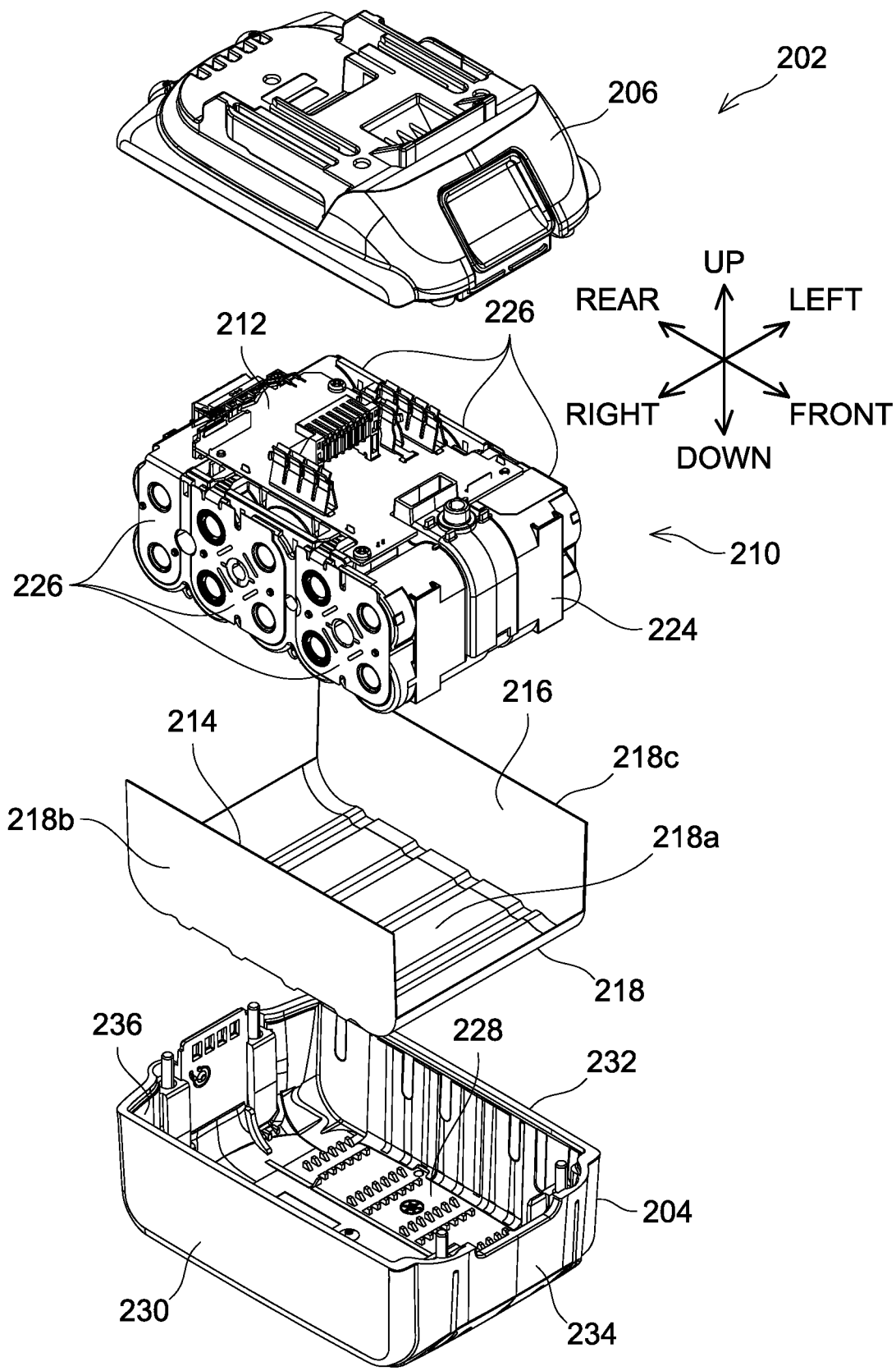
FIG. 13 is an exploded, oblique view of the battery pack 202 according to Working Example 2.

As shown in FIG. 13, a battery-cell module 210, a control circuit board 212, fire-extinguishing agents 214, 216, and a flame-resistant member 218 are housed in the interior of the casing 208.

The battery-cell module 210 comprises: a plurality of battery cells 222 (refer to FIG. 14); a cell holder 224, which is made of a resin or polymer (e.g., polycarbonate) and holds the plurality of battery cells 222; and lead plates 226, which electrically connect the plurality of battery cells 222 to the control circuit board 212. The control circuit board 212 is fixed to an upper surface of the cell holder 224 by a fastener. The control circuit board 212 is, for example, a glass-epoxy substrate. Similar to Working Example 1, the lead plates 226 are intended to be conductive plates or tabs and the composition of the lead plates 226 may be a conductive metal, such as copper, copper alloy, aluminum, aluminum alloy, etc.

Figure 14:
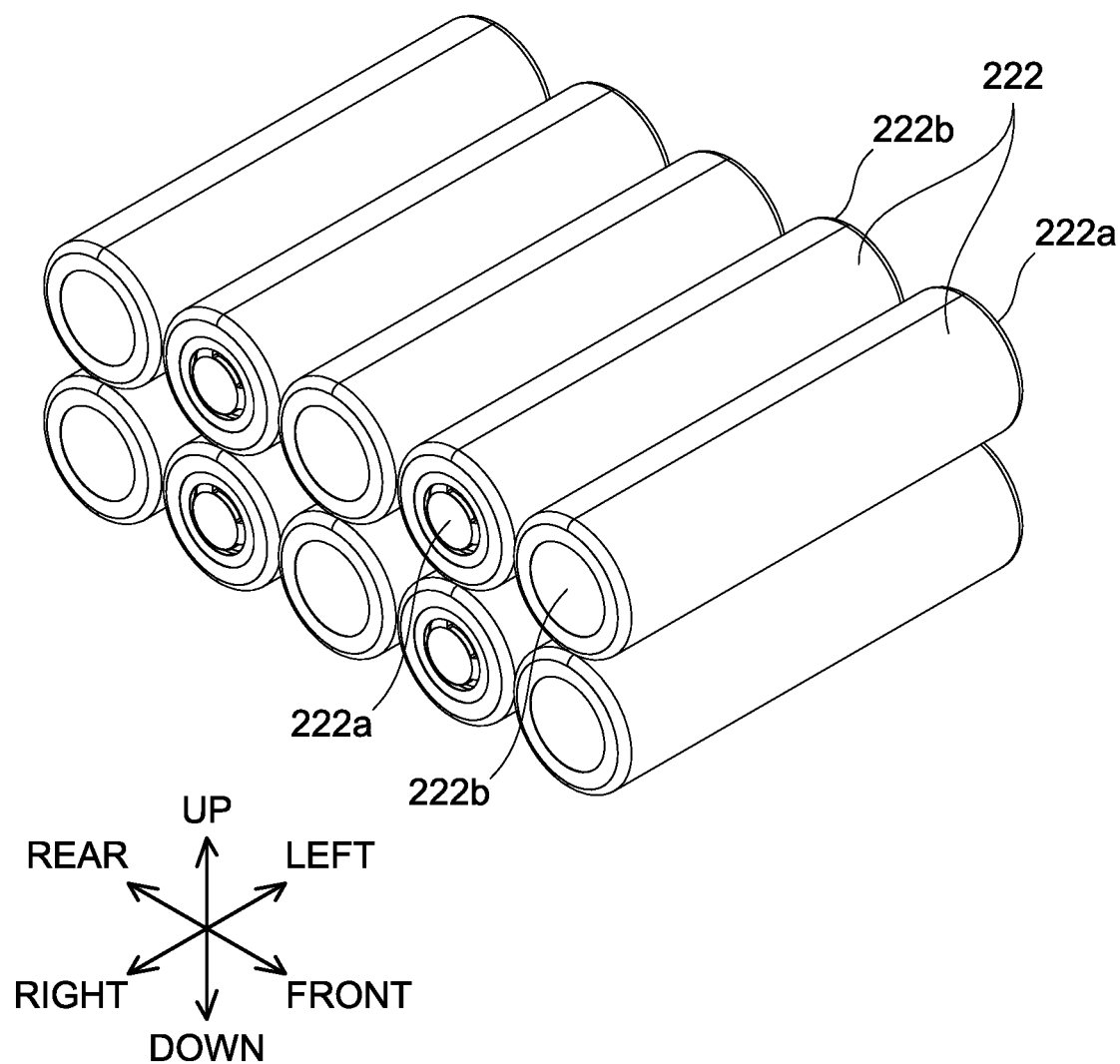
FIG. 14 is an oblique view of a plurality of battery cells 222 of the battery pack 202 according to Working Example 2.

As shown in FIG. 14, each of the battery cells 222 is a secondary (rechargeable) battery cell having, for example, a substantially circular-column shape, and is, for example, a lithium-ion battery cell. Each of the battery cells 222 has, for example, the shape of an 18650-type cell, a volumetric-energy density of 653 Wh/liter, a rated capacity of 3 Ah, and a rated voltage of 3.6 V. It is noted that each of the battery cells 222 may have a volumetric-energy density of 327 Wh/liter and/or may have a rated capacity of 1.5 Ah. Alternatively, each of the battery cells 222 may have a volumetric-energy density of 436 Wh/liter and/or may have a rated capacity of 2 Ah. Alternatively, each of the battery cells 222 may have a volumetric-energy density of 544 Wh/liter and/or may have a rated capacity of 2.5 Ah. Alternatively, each of the battery cells 222 may have a volumetric-energy density of 653 Wh/liter and/or may have a rated capacity of 3 Ah. Alternatively, each of the battery cells 222 may have the shape of a 21700-type cell, may have a volumetric-energy density of 594 Wh/liter, may have a rated capacity of 4 Ah, and/or may have a rated voltage of 3.6 V. It is noted that each of the battery cells 222 is not limited to having a substantially circular-column shape and may be a so-called rectangular-prism type or may be a laminate type. With regard to the battery pack 202, each of the battery cells 222 is charged or chargeable to an SOC (state of charge) of 90% or more. Each of the battery cells 222 comprises a positive electrode 222a and a negative electrode 222b, which serve as electrodes. Each of the positive electrodes 222a is disposed on (at) one end surface of the corresponding battery cell 222 in the longitudinal direction, and each of the negative electrodes 222b is disposed on (at) the other end surface of the corresponding battery cell 222 in the longitudinal direction. The battery cells 222 are disposed lined up in the front-rear direction and the up-down direction such that their longitudinal directions are aligned in the left-right direction. In the present Working Example 2, the battery-cell module 210 comprises a total of ten (10) of the battery cells 222, with two across in the up-down direction and five across in the front-rear direction. Some of the battery cells 222 are held by the cell holder 224 such that the positive electrodes 222a are exposed at a right surface of the cell holder 224 and such that the negative electrodes 222b are exposed at a left surface of the cell holder 224. The remainder of the battery cells 222 are held by the cell holder 224 such that the positive electrodes 222a are exposed at the left surface of the cell holder 224 and such that the negative electrodes 222b are exposed at the right surface of the cell holder 224. As shown in FIG. 13, the lead plates 226 are provided on the right surface and the left surface of the battery-cell module 210, and each of the positive electrodes 222a and each of the negative electrodes 222b of the battery cells 222 are electrically connected to the control circuit board 212.

The composition of the fire-extinguishing agents 214, 216 may be the same as the fire-extinguishing agents 40, 42, 44, 46 of Working Example 1. The composition of the flame-resistant member 218 also may be the same as the flame-resistant members 48, 50 of Working Example 1. The flame-resistant member 218 comprises: a lower part (lower sheet) 218a, which is disposed opposing the lower surface of the battery-cell module 210; a right part (right sheet) 218b, which is disposed opposing the right surface of the battery-cell module 210; and a left part (left sheet) 218c, which is disposed opposing the left surface of the battery-cell module 210. The fire-extinguishing agent 214 is mounted on the left surface of the right part 218b of the flame-resistant member 218. The fire-extinguishing agent 216 is mounted on the right surface of the left part 218c of the flame-resistant member 218. In the present working example, the fire-extinguishing agents 214, 216 are adhered to the flame-resistant member 218 by adhesive tape.

The lower-side casing 204 comprises: a lower plate 228; a right plate 230, which extends upward from the right end of the lower plate 228; a left plate 232, which extends upward from the left end of the lower plate 228; a front plate 234, which extends upward from the front end of the lower plate 228; and a rear plate 236, which extends upward from the rear end of the lower plate 228. The external shape of the lower-side casing 204 is defined by the lower plate 228, the right plate 230, the left plate 232, the front plate 234, and the rear plate 236.

When the battery-cell module 210 is mounted on the lower-side casing 204, the lower plate 228 opposes the lower surface of the battery-cell module 210, the right plate 230 opposes the right surface of the battery-cell module 210, the left plate 232 opposes the left surface of the battery-cell module 210, the front plate 234 opposes the front surface of the battery-cell module 210, and the rear plate 236 opposes the rear surface of the battery-cell module 210. When the lower-side casing 204 is mounted on the battery-cell module 210, the lower part 218a of the flame-resistant member 218 is interposed and held by the cell holder 224 and the lower plate 228 of the lower-side casing 204.

It is noted that the fire-extinguishing agents 214, 216 do not have to be adhered to the flame-resistant member 218. The flame-resistant member 218 does not have to be interposed between and held by the lower-side casing 204 and the cell holder 224. For example, the fire-extinguishing agents 214, 216 and/or the flame-resistant member 218 may be adhered to the cell holder 224 by adhesive tape or may be adhered to the lower-side casing 204 by adhesive tape.

There are situations in which, owing to inappropriate handling and/or usage of the battery pack 202, one or more of the battery cells 222 may ignite and consequently flames may be emitted from one or more of the positive electrodes 222a. In such situations, with regard to the battery pack 202 of the present working example, owing to the fire-suppressing effect and/or the negative-catalyst effect of the fire-extinguishing agents 214, 216, flames from the battery cells 222 are extinguished. According to the battery pack 202 of the present Working Example 2, even if one or more of the battery cells 222 have ignited, they can be rapidly extinguished.

With regard to the battery pack 202 of the present Working Example 2, the fire-extinguishing agent 214 and the right part 218b of the flame-resistant member 218 are interposed between the positive electrodes 222a of the battery cells 222 and the right plate 230 of the lower-side casing 204. In addition, the fire-extinguishing agent 216 and the left part 218c of the flame-resistant member 218 are interposed between the positive electrodes 222a of the battery cells 222 and the left plate 232 of the lower-side casing 204. By adopting such a configuration, even if flames emitted from the battery cells 222 have broken through the fire-extinguishing agents 214, 216, the flames are blocked by the flame-resistant member 218, and therefore it is possible to inhibit, suppress or block flames from reaching the right plate 230 and the left plate 232 of the lower-side casing 204.

It is noted that the fire-extinguishing agents 214, 216 and the flame-resistant member 218 of the present Working Example 2 likewise may be sealed by a pair of laminate films that respectively cover the front surfaces and rear surfaces, in a manner similar to the flame-resistant members 48, 50 of the fire-extinguishing agents 40, 42, 44, 46 of Working Example 1.

In one or more of the embodiments as described above, the battery pack 202 (example of a battery apparatus according to the present teachings) comprises: the battery cells 222; the fire-extinguishing agents 214, 216, which include the components, chemicals or composition that provide (have) the fire-suppressing effect and/or the negative-catalyst effect with respect to combustion (the combustion inhibiting effect or combustion suppressing effect); the flame-resistant member 218, whose limiting oxygen index is higher than the oxygen concentration in the atmosphere; and the casing (housing) 208, which is made of a resin (polymer) and houses the battery cells 222, the fire-extinguishing agents 214, 216, and the flame-resistant member 218. The fire-extinguishing agents 214, 216 are interposed between the battery cells 222 and the casing 208. The flame-resistant member 218 is interposed between the fire-extinguishing agents 214, 216 and the casing 208.

According to the above-mentioned configuration, in the event that one or more of the battery cells 222 have been subject to inappropriate handling and consequently has (have) ignited, the fire can be rapidly extinguished by the fire-suppressing effect and/or the negative-catalyst effect of the fire-extinguishing agents 214, 216. In addition, according to the above-mentioned configuration, even if flames emitted from the battery cells 222 of the battery pack 202 have broken through the fire-extinguishing agents 214, 216, the flames are blocked by the flame-resistant member 218, and therefore it is possible to inhibit, suppress or block flames from reaching the casing 208.

In one or more embodiments, the battery cells 222 have a substantially circular-column shape. The fire-extinguishing agents 214, 216 and the flame-resistant member 218 are interposed between end surfaces of the battery cells 222 in the longitudinal direction and the casing 208.

If one or more of the battery cells 222 having a substantially circular-column shape has (have) ignited, flames are likely to extend (emanate, spread, grow) from the end surface(s) of the ignited battery cell(s) 222. According to the above-mentioned configuration, in the event that one or more of the battery cells 222 have ignited, the fire-extinguishing agents 214, 216 are directly to the flames, and thereby the fire-suppressing effect and/or the negative-catalyst effect can be rapidly exhibited. In the event that one or more of the battery cells 222 have been subjected to inappropriate handling and/or usage and consequently has (have) ignited, the fire can be rapidly extinguished. In addition, according to the above-mentioned configuration, even if flames extending from the end surface(s) of one or more of the battery cells 222 break through the fire-extinguishing agents 214, 216, the flames are blocked by the flame-resistant member 218, and therefore it is possible to inhibit, suppress or block the flames from reaching the casing 208.

In one or more embodiments, the battery pack 202 further comprises the cell holder 224, which holds the battery cells 222. The battery cells 222 are held by the cell holder 224 such that the end surfaces in the longitudinal direction are exposed at the opposite side surfaces of the cell holder 224. The flame-resistant member(s) 218 cover(s) the entirety of the opposite side surfaces of the cell holder 224.

According to the above-mentioned configuration, because the entirety of the opposite side surfaces of the cell holder 224, at which the end surfaces of the battery cells 222 are exposed, is covered by the flame-resistant member(s) 218, it is possible to inhibit, suppress or block flames extending from the end surfaces of the battery cells 222 from reaching the casing 208.

In one or more embodiments, the flame-resistant member(s) 218 is (are) interposed between and held by the cell holder 224 and the casing 208.

According to the above-mentioned configuration, when the battery pack 202 is used by being carried around, the possibility of adverse mispositioning (inappropriate shifting or displacement) of the flame-resistant member 218 can be reduced.

In one or more embodiments, the flame-resistant member(s) 218 is (are) adhered to the casing 208.

According to the above-mentioned configuration, when the battery pack 202 is used by being carried around, the possibility of adverse mispositioning (inappropriate shifting or displacement) of the flame-resistant member(s) 218 relative to the casing 208 can be reduced.

In one or more embodiments, the flame-resistant member(s) 218 is (are) adhered to the fire-extinguishing agents 214, 216.

According to the above-mentioned configuration, when the battery pack 202 is used by being carried around, the possibility of adverse mispositioning (inappropriate shifting or displacement) of the flame-resistant member(s) 218 relative to the fire-extinguishing agents 214, 216 can be reduced.

In one or more embodiments, the battery pack 202 further comprises the laminate films (example of the protective member), which cover the flame-resistant member(s) 218.

According to the above-mentioned configuration, even in situations such as in the event that the battery pack 202 has been subjected to an impact or water has penetrated into the interior of the battery pack 202, the flame-resistant member(s) 218 can be protected.

In one or more embodiments, the laminate films cover both the flame-resistant member(s) 218 and the fire-extinguishing agents 214, 216.

According to the above-mentioned configuration, even in situations such as in the event that the battery pack 202 has been subject to an impacted or water has penetrated into the interior of the battery pack 202, the flame-resistant member(s) 218 and the fire-extinguishing agents 214, 216 can be protected.

In one or more embodiments, the battery cells 222 are charged or are chargeable to an SOC (state of charge) of 90% or more.

In the state in which the SOC of the battery cells 222 is high, there is a risk that the battery cells 222 will burn aggressively in case the battery cells 222 ignite. According to the above-mentioned configuration, if one or more of the battery cells 222 have been subjected to inappropriate handling and/or usage and consequently has (have) ignited, adverse aggressive burning can be inhibited or suppressed. In addition, even if one or more of the battery cells 222 have ignited, it is possible to inhibit, suppress or block flames from adversely reaching the casing 208.

In one or more embodiments, the energy density of the battery cells 222 is 300 Wh/liter or more.

If the energy density of the battery cells 222 is high, then there is a risk that, in the event that the battery cells 222 have ignited, the battery cells 222 will burn aggressively. According to the above-mentioned configuration, if one or more of the battery cells 222 have been subjected to inappropriate handling and/or usage and consequently has (have) ignited, adverse aggressive burning can be inhibited or suppressed. In addition, even if one or more of the battery cells 222 have ignited, it is possible to inhibit, suppress or block flames from adversely reaching the casing 208.

In one or more embodiments, the battery cells 222 are lithium-ion battery cells.

The risk that a lithium-ion battery cell will ignite, owing to a variety of causes, is higher than in other types of battery cells. According to the above-mentioned configuration, even if the lithium-ion battery cells have been subjected to inappropriate handling and/or usage and consequently have ignited, the fire can be rapidly extinguished. In addition, even if one or more of the lithium-ion battery cells have ignited, it is possible to inhibit, suppress or block flames from adversely reaching the casing.

A battery pack (battery cartridge) 202 according to the present teachings, when embodied as shown in FIG. 12, may contain a number and type of battery cells such that the battery pack 202 as a whole as a nominal output voltage of at least 12 volts, more preferably at least 18 volts, or at least 36 volts. The upper limit of the nominal output voltage is not particularly limited, but may be, e.g., 60 volts, or 50 volts, or 40 volts. In addition or in the alternative, a battery pack 202 according to the present teachings, when embodied as shown in FIG. 12, may contain a number and type of battery cells such that the battery pack 202 as a whole as a nominal output capacity of at least 2.0 amp hours, more preferably at least 3 amp hours, e.g., at least 4 amp hours. The upper limit of the nominal output capacity is not particularly limited, but may be, e.g., 20 amp hours, or 15 amp hours or 10 amp hours.

EXPLANATION OF THE REFERENCE NUMBERS

2 Backpack-type power supply
4 Battery apparatus
6 Backpack frame
8 Shoulder belt
10 Hip belt
12 Charging plug
14 Discharging cable
16 Discharging plug
18 Remaining-charge indication lamp
20 Remaining-charge indication button
22 Front-side casing 24 Rear-side casing
26 Inner cover
28 Casing
30 Chamber
34 Battery-cell module
36 Battery-cell module
38 Control circuit board
40 Fire-extinguishing agent
42 Fire-extinguishing agent
44 Fire-extinguishing agent
46 Fire-extinguishing agent
48 Flame-resistant member
48a Front part
48b Right part
48c Left part
48d Through hole
48e Through hole
50 Flame-resistant member
50a Front part
50b Right part
50c Left part
50d Through hole
50e Through hole
52 Electric work machine
52a Battery-pack mount part
54 Adapter
56 Battery cell
56a Positive electrode
56b Negative electrode
58 Battery cell
58a Positive electrode
58b Negative electrode
60 Cell holder
62 Cell holder
64 Lead plate
66 Lead plate
68 Front plate
68a Slit
70 Right-outer plate
72 Left-outer plate
74 Upper-outer plate
76 Lower-outer plate
78 Right-inner plate
80 Left-inner plate
82 Upper-inner plate
84 Lower-inner plate
86 Right-center plate
88 Left-center plate
90 Coupling plate
92 Rib
94 Rib
96 Fastening boss
98 Fastening boss
100 Positioning boss
102 Positioning boss
104 Screw boss
106 Screw boss
108 Positioning boss
110 Positioning boss
112 Countersink hole
114 Countersink hole
116 Screw
118 Screw
202 Battery pack (type of battery apparatus)
204 Lower-side casing
206 Upper-side casing
208 Casing
210 Battery-cell module
212 Control circuit board
214 Fire-extinguishing agent
216 Fire-extinguishing agent
218 Flame-resistant member
218a Lower part
218b Right part
218c Left part
222 Battery cell
222a Positive electrode
222b Negative electrode
224 Cell holder
226 Lead plate
228 Lower plate
230 Right plate
232 Left plate
234 Front plate
236 Rear plate

I claim:

1. A battery apparatus comprising:
one or more battery cells mounted in a cell holder;
a fire-extinguishing agent, which includes or contains a component, chemical or composition that has a fire-suppressing effect;
a flame-resistant member having a limiting oxygen index that is higher than the oxygen concentration in the atmosphere; and
a casing made of a polymer;
wherein:
the flame-resistant member comprises a channel having a base, a first side wall extending from the base and a second side wall projecting from the base,
the flame-resistant member is mounted in the casing,
the cell holder is mounted in the channel of the flame-resistant member such that a longitudinal axis of each of the one or more battery cells intersects the first and second side walls, and the fire-extinguishing agent is interposed between the cell holder and the flame-resistant member.

2. The battery apparatus according to claim 1, wherein:
the one or more battery cells has (have) a circular-column shape; and
the fire-extinguishing agent and the flame-resistant member are interposed between an end surface of the one or more battery cells in a longitudinal direction and the casing.

3. The battery apparatus according to claim 2,
wherein:
the one or more battery cells is (are) held by the cell holder such that end surface(s) of the one or more battery cells in the longitudinal direction is (are) exposed at a side surface of the cell holder; and
the first side wall of the flame-resistant member overlies the entirety of the side surface of the cell holder.

4. The battery apparatus according to claim 2,
wherein:
the one or more battery cells is (are) held by the cell holder such that the end surfaces of the one or more battery cells in the longitudinal direction are exposed at the side surfaces of the cell holder;
the flame-resistant member is composed of a flame-resistant rubber having a limiting oxygen index of at least 23 and covers the entirety of the side surfaces of the cell holder;
the flame-resistant member is adhered to the casing and/or to the fire-extinguishing agent;

each of the one or more battery cells is a lithium-ion battery cell having an energy density of 300 Wh/liter or more; and
the battery apparatus has a nominal output voltage of at least 18 volts and a nominal output capacity of at least 2 amp hours.

5. The battery apparatus according to claim 1, wherein:
the casing is mountable on and demountable from a backpack frame, to which a shoulder belt is attached; and
the flame-resistant member is interposed between a portion of the battery apparatus that opposes the backpack frame of the casing and the one or more battery cells.

6. The battery apparatus according to claim 1, wherein:
the base of the flame-resistant member has a through hole;
the cell holder has an opening aligned with the through hole of the flame-resistant member; and
the casing comprises a boss that protrudes inward from an inner surface of the casing through the through hole of the flame-resistant member and into the hole in the cell holder.

7. The battery apparatus according to claim 1, wherein the flame-resistant member is adhered to the casing.

8. The battery apparatus according to claim 1, wherein the flame-resistant member is adhered to the fire-extinguishing agent.

9. The battery apparatus according to claim 1, further comprising a laminate film on a surface of the fire-extinguishing agent facing the cell holder.

10. The battery apparatus according to claim 1, wherein the one or more battery cells is (are) chargeable to a state of charge of 90% or more.

11. The battery apparatus according to claim 1, wherein each of the one or more battery cells has an energy density of 300 Wh/liter or more.

12. The battery apparatus according to claim 1, wherein the one or more battery cells is (are) one or more lithium-ion battery cells.

13. The battery apparatus according to claim 1, wherein the flame-resistant member is composed of a flame-resistant rubber.

14. The battery apparatus according to claim 1, wherein the flame-resistant member is composed of a polymer material and has a limiting oxygen index of at least 23.

15. The battery apparatus according to claim 1, wherein the battery apparatus has a nominal output voltage of at least 18 volts.

16. The battery apparatus according to claim 1, wherein the battery apparatus has a nominal output capacity of at least 800 Watt hours.

17. The battery apparatus according to claim 1, wherein the fire-extinguishing agent either:
absorbs or covalently binds to combustion gases; or
generates sodium chloride, sodium carbonate, or sodium sulfate in response combustion or heating.

18. The battery apparatus according to claim 1, wherein:
the casing includes a first rib and a second rib parallel to the first rib;
a first connecting wall extends from the first side wall of the fire-resistant member toward the second side wall of the fire-resistant member and a second connecting wall extends from the first connecting wall to the base of the fire-resistant member;
a third connecting wall extends from the second side wall of the fire-resistant member toward the first side wall of the fire-resistant member and a fourth connecting wall extends from the third connecting wall to the base of the fire-resistant member; and
the first connecting wall rests on the first rib and the third connecting wall rests on the second rib.

19. The battery apparatus according to claim 1, wherein:
the base of the flame-resistant member has a through hole;
a portion of the fire-extinguishing agent is located on the base between the base and the cell holder,
the cell holder has an opening aligned with the through hole of the flame-resistant member; and
the casing comprises a boss that protrudes inward from an inner surface of the casing through the through hole of the flame-resistant member and through the portion of the fire extinguishing agent and into the hole in the cell holder.

20. The battery apparatus according to claim 1, wherein:
a portion of the fire-extinguishing agent is sandwiched between the base of the flame-resistant member and the cell holder;
the casing is mountable on and demountable from a backpack frame, to which a shoulder belt is attached; and
the portion of the fire-extinguishing agent is located between the cell holder and the backpack frame.

* * * * *